(12) United States Patent
Sekizawa et al.

(10) Patent No.: US 7,164,529 B2
(45) Date of Patent: Jan. 16, 2007

(54) POLARIZING EYEGLASS DEVICE

(75) Inventors: Hidehiko Sekizawa, Tokyo (JP); Seiji Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/656,829

(22) Filed: Sep. 5, 2003

(65) Prior Publication Data
US 2004/0114232 A1 Jun. 17, 2004

(30) Foreign Application Priority Data
Sep. 6, 2002 (JP) ............... 2002-262174

(51) Int. Cl.
G02B 27/26 (2006.01)
G02B 27/22 (2006.01)
H04N 9/47 (2006.01)

(52) U.S. Cl. ............ 359/465; 359/462; 359/464; 348/57

(58) Field of Classification Search ......... 359/465, 359/462, 464; 348/57, 58; 351/165
See application file for complete search history.

(56) References Cited
U.S. PATENT DOCUMENTS
4,989,967 A * 2/1991 Matsuda ............ 351/165

FOREIGN PATENT DOCUMENTS
JP 2002-196281 12/2002
WO WO 95/00872 * 1/1995

* cited by examiner

Primary Examiner—Audrey Chang
(74) Attorney, Agent, or Firm—Wolf, Greenfield & Sacks, P.C.

(57) ABSTRACT

A polarizing eyeglass device is disclosed which achieves improvement in compatibility and also in convenience in use when it is used to view an image displayed on an image display screen of a stereoscopic image display apparatus. The polarizing eyeglass device includes a polarized light separation means for separating particular polarized light. The polarized light separation means includes a first viewing region to be used for viewing with one of the left and right eyes and a second viewing region to be used for viewing with the other eye. A first polarization direction changing means is adhered to a first face of the polarized light separation means in the first viewing region. A second polarization direction changing is adhered to a second face opposite to the first face of the polarized light separation means in the second viewing region.

11 Claims, 32 Drawing Sheets

FIG. 11

| POLARIZING EYEGLASS DEVICE | STEREOSCOPIC IMAGE DISPLAY APPARATUS | | | |
|---|---|---|---|---|
| | TYPE I | TYPE II | TYPE III | TYPE IV |
| SERVICE CONDITION A | △ | × | × | ○ |
| SERVICE CONDITION B | ○ | × | × | △ |
| SERVICE CONDITION C | × | ○ | △ | × |
| SERVICE CONDITION D | × | △ | ○ | × |

F I G. 16
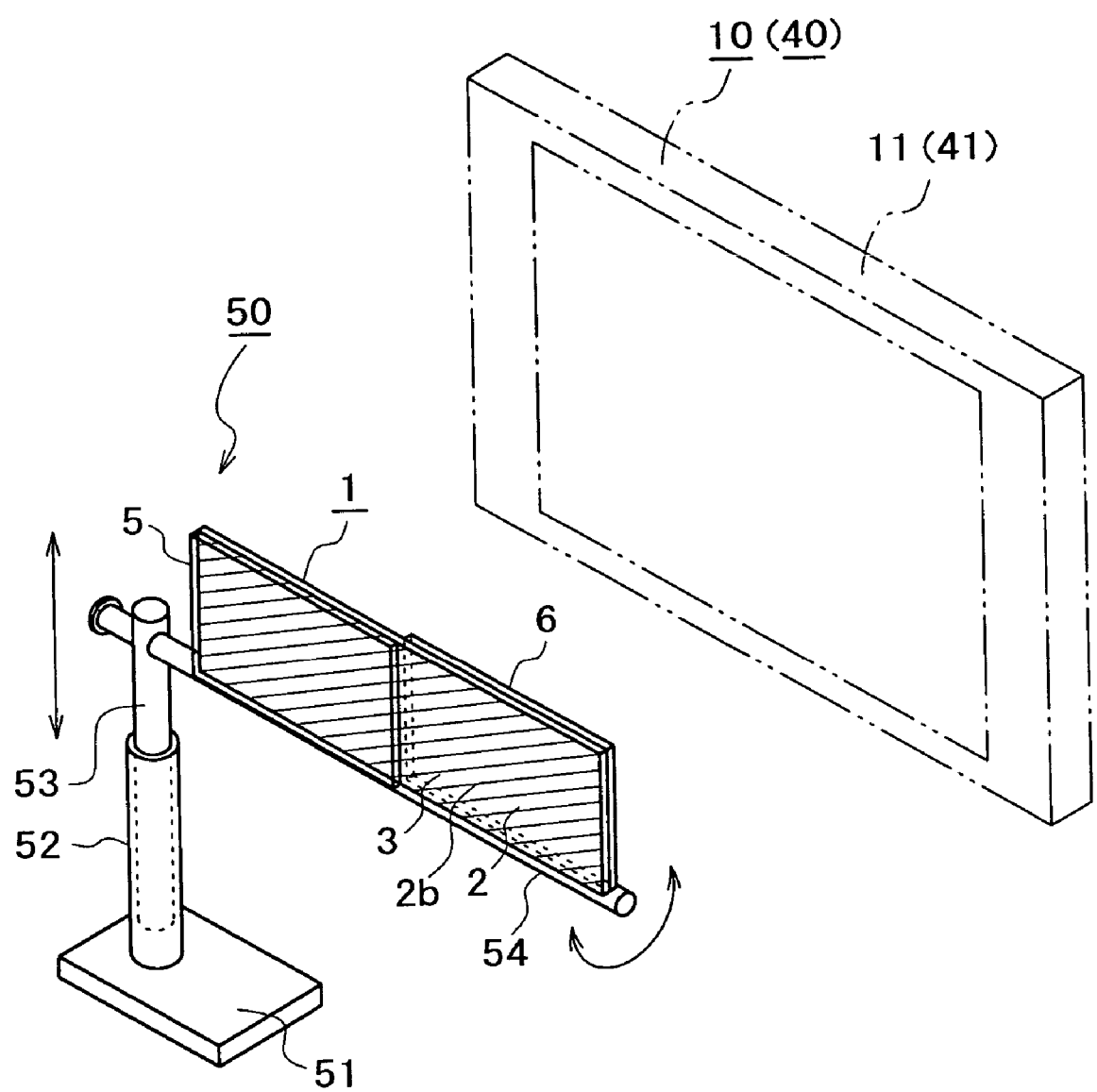

F I G. 18
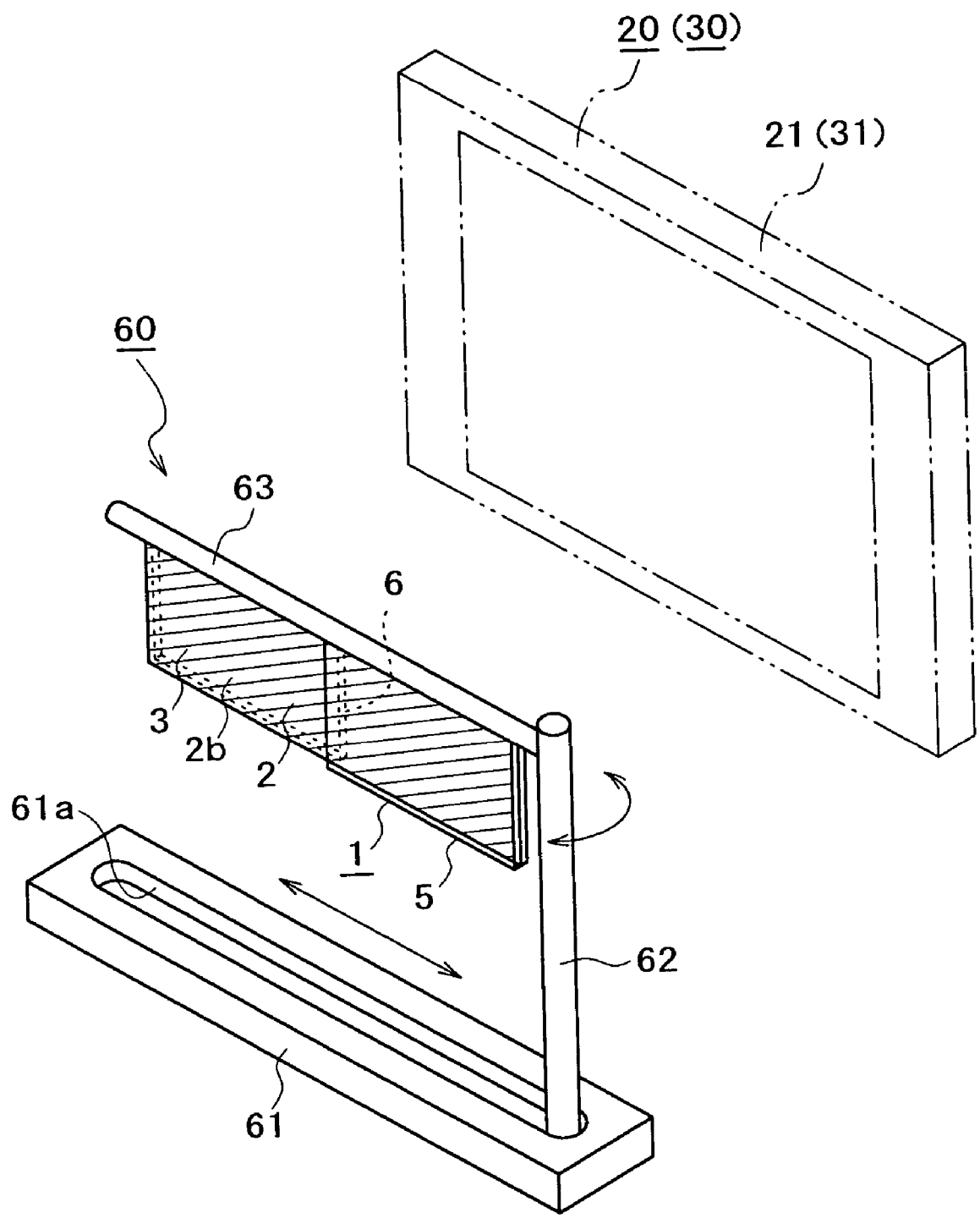

F I G. 19
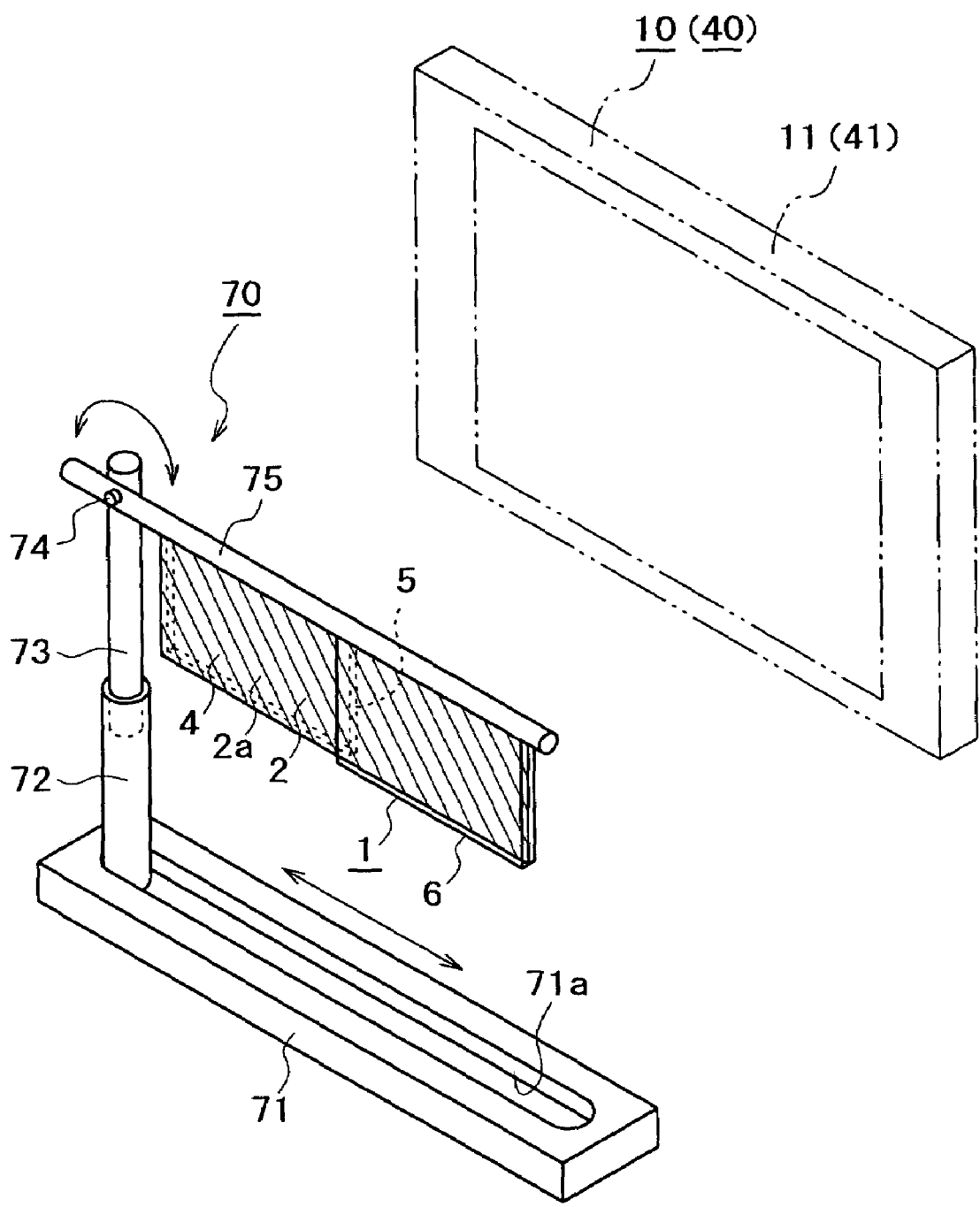

FIG. 27

| STEREOSCOPIC IMAGE DISPLAY APPARATUS | | | | | |
|---|---|---|---|---|---|
| | TYPE I | TYPE II | TYPE III | TYPE IV | |
| | △ | × | × | ○ | SERVICE CONDITION E |
| | × | ○ | △ | × | SERVICE CONDITION F |
| | ○ | × | × | △ | SERVICE CONDITION G |
| | × | △ | ○ | × | SERVICE CONDITION H |
| | | | | | POLARIZING EYEGLASS DEVICE |

POLARIZING EYEGLASS DEVICE

BACKGROUND OF THE INVENTION

This invention relates to a polarizing eyeglass device, and more particularly to a technical field for improving the compatibility in viewing an image displayed on an image display screen of a stereoscopic image display apparatus.

Various methods have been proposed for representing a stereoscopic image using a liquid crystal display screen. For example, a method is available wherein a polarizing eyeglass device is used to view an image displayed on an image display screen of a stereoscopic image display apparatus as a stereoscopic image making use of the parallax of the two eyes.

FIG. 32 shows an exemplary one of conventional stereoscopic image display apparatus and polarizing eyeglass devices for viewing a stereoscopic image (refer to Patent document 1: Japanese Patent Laid-Open No. 2002-196281 (pages 5 to 6, FIG. 3)).

Referring to FIG. 32, an image display screen b in the form of liquid crystal display screen of a stereoscopic image display apparatus a in the form of a liquid crystal display apparatus has a plurality of horizontal areas S divided in a vertical direction. The horizontal areas S include first areas Sa and second areas Sb arranged, for example, alternately from above. For example, images cR for the right eye are individually displayed in the first areas Sa while images cL for the left eye are individually displayed in the second areas Sb.

A polarizing plate d having, for example, a leftwardly upwardly inclined angle of polarization is adhered to the image display screen b. A half-wave plate e for changing the polarization direction of polarized light emitted from a second area Sb through the polarizing plate d by 90° is adhered to the region of a face of the polarizing plate d on the side facing the viewer which corresponds to each of the second areas Sb. Consequently, the polarization angle of polarized light emitted from the second areas Sb through the polarizing plate d is changed into a rightwardly upwardly inclined polarization angle by the half-wave plates e.

The polarizing eyeglass device f includes a horizontally elongated polarizing plate g having, for example, a rightwardly upwardly inclined polarization angle. A half-wave plate h having an optical axis orthogonal to that of the half-wave plates e of the stereoscopic image display apparatus a is adhered to a face of the right half of the polarizing plate g on the side facing the image display screen b.

If the polarizing eyeglass device f is used for viewing the image display screen b of the stereoscopic image display apparatus a configured as described above, then the left eye El of the viewer who looks through the polarizing plate g cannot view the right eye images cR because the polarization angles of the polarizing plate d of the stereoscopic image display apparatus a and the polarizing plate g of the polarizing eyeglass device f are orthogonal to each other. On the other hand, the left eye El of the viewer can view the left eye images cL. This is because the polarization direction of the polarized light emitted from the second areas Sb through the polarizing plate d is changed by 90° by the half-wave plates e present between the polarizing plates d and g whose polarization angles are orthogonal to each other.

On the other hand, the right eye Er of the viewer who looks through the polarizing plate g cannot view the left eye images cL. This is because, although the polarization direction of the polarized light emitted from the second areas Sb through the polarizing plate d is changed by 90° by the half-wave plates e present between the polarizing plates d and g whose polarization angles are orthogonal to each other, the polarization direction of the polarized light having been changed in this manner is changed back to the original polarization direction by the half-wave plate h which has the orthogonal optical axis. In contract, the right eye Er can view the right eye images cR. This is because the polarization direction of the polarized light emitted from the second areas Sb through the polarizing plate d is changed by 90° by the half-wave plate h present between the polarizing plates d and g whose polarization angles are orthogonal to each other.

Accordingly, the left eye El views only the left eye images cL while the right eye Er views only the right eye images cR. Therefore, the viewer can view a stereoscopic image assembled from the left eye images cL and the right eye images cR.

Also another stereoscopic image display apparatus is available which includes polarizing plates having polarization directions different from those described above. An exemplary one of such conventional stereoscopic image display apparatus and polarizing eyeglass devices for viewing a stereoscopic image as just mentioned is described below with reference to FIG. 33.

An image display screen j in the form of liquid crystal display screen of a stereoscopic image display apparatus i in the form of a liquid crystal display apparatus has a plurality of horizontal areas S divided in a vertical direction. Right eye images cR are displayed in first areas Sa of the horizontal areas S while left eye images cL are displayed in second areas Sb of the horizontal areas S.

A polarizing plate k having, for example, a rightwardly upwardly inclined angle of polarization is adhered to the image display screen j. A half-wave plate l for changing the polarization direction of polarized light emitted from a second area Sb through the polarizing plate k by 90° is adhered to that region of a face of the polarizing plate k on the side facing the viewer which corresponds to each of the second areas Sb. Consequently, the polarization angle of polarized light emitted from the second areas Sb through the polarizing plate k is changed to a leftwardly upwardly inclined polarization angle by the half-wave plates l.

The polarizing eyeglass device m includes a horizontally elongated polarizing plate n having, for example, a leftwardly upwardly inclined polarization angle. A half-wave plate o having an optical axis orthogonal to that of the half-wave plates l of the stereoscopic image display apparatus i is adhered to a face of the right half of the polarizing plate n on the side facing the image display screen j.

If the polarizing eyeglass device m is used to view the image display screen j of the stereoscopic image display apparatus i, then the left eye El of the viewer who looks through the polarizing plate n cannot view the right eye images cR. This is because the polarization angles of the polarizing plate k of the stereoscopic image display apparatus i and the polarizing plate n of the polarizing eyeglass device m are orthogonal to each other. On the other hand, the left eye El of the viewer can view the left eye images cL. This is because the polarization direction of the polarized light emitted from the second areas Sb through the polarizing plate k is changed by 90° by the half-wave plates l present between the polarizing plates k and n whose polarization angles are orthogonal to each other.

On the other hand, the right eye Er of the viewer who looks through the polarizing plate n cannot view the left eye images cL. This is because, although the polarization direction of the polarized light emitted from the second areas Sb through the polarizing plate k is changed by 90° by the half-wave plates l present between the polarizing plates k and n whose polarization angles are orthogonal to each other, the polarization direction of the polarized light having been changed in this manner is changed back to the original polarization direction by the half-wave plate o which has the orthogonal optical axis. In contract, the right eye Er can view the right eye images cR. This is because the polarization direction of the polarized light emitted from the second areas Sb through the polarizing plate k is changed by 90° by the half-wave plate o present between the polarizing plates k and n whose polarization angles are orthogonal to each other.

Accordingly, the left eye El views only the left eye images cL while the right eye Er views only the right eye images cR. Therefore, the viewer can view a stereoscopic image assembled from the left eye images cL and the right eye images cR.

In the conventional stereoscopic image display apparatus a and i, however, the inclinations of polarized light by the polarizing plates d and k are different from each other. Therefore, the stereoscopic image display apparatus a and i require the polarizing eyeglass devices f and m for exclusive use different from each other as described above, respectively. Consequently, the stereoscopic image display apparatus a and i are poor in compatibility and require a high cost as much.

Further, if a polarizing eyeglass device prepared for viewing a stereoscopic image is not compatible with a stereoscopic image display apparatus which displays the image to be viewed, then the viewer cannot view the stereoscopic image disadvantageously.

SUMMARY OF THE INVENTION

It is an object of the present invention to provide a polarizing eyeglass device which overcomes the problems described above and achieves improvement in compatibility and also in convenience in use when it is used to view an image displayed on an image display screen of a stereoscopic image display apparatus.

In order to attain the object described above, according to an aspect of the present invention, there is provided a polarizing eyeglass device for use with a stereoscopic image display apparatus which includes an image display screen having first areas and second areas in which pieces of image information corresponding to the parallax are displayed individually, a polarizing plate disposed in an opposing relationship to the image display screen, and phase difference plates adhered to a front face of the polarizing plate at positions corresponding to the first areas or the second areas of the image display screen for changing the polarization direction, the polarizing eyeglass device being used to enjoy an image displayed on the image display screen of the stereoscopic image display apparatus, comprising polarized light separation means for separating particular polarized light, the polarized light separation means including a first viewing region to be used for viewing with one of the left and right eyes and a second viewing region to be used for viewing with the other one of the left eye and the right eye, first polarization direction changing means adhered to a first face of the polarized light separation means in the first viewing region, and second polarization direction changing means adhered to a second face opposite to the first face of the polarized light separation means in the second viewing region.

The polarizing glass device can be used to view, in a predetermined service condition thereof, an image displayed on the image display screen of the stereoscopic image display apparatus irrespective of the type of the stereoscopic image display apparatus. Consequently, improvement in compatibility is achieved, and reproduction of the cost can be anticipated.

Further, the polarizing eyeglass device eliminates such a trouble that a polarizing eyeglass device prepared intentionally for viewing a stereoscopic image by a viewer is not compatible with a stereoscopic image display apparatus on which the image to be viewed is to be displayed. Consequently, improvement in convenience in use can be achieved.

According to another aspect of the present invention, there is provided a polarizing eyeglass device for use with a stereoscopic image display apparatus which includes an image display screen having first areas and second areas in which pieces of image information corresponding to the parallax are displayed individually, a polarizing plate disposed in an opposing relationship to the image display screen, and phase difference plates adhered to a front face of the polarizing plate at positions corresponding to the first areas or the second areas of the image display screen for changing the polarization direction, the polarizing eyeglass device being used to enjoy an image displayed on the image display screen of the stereoscopic image display apparatus, comprising polarized light separation means for separating particular polarized light, the polarized light separation means including a first viewing region to be used for viewing with one of the left and right eyes and a second viewing region to be used for viewing with the other one of the left eye and the right eye, first polarization direction changing means adhered to a first face of the polarized light separation means in the first viewing region or the second viewing region, and second polarization direction changing means adhered to a second face opposite to the first face of the polarized light separation means in the first viewing region or the second viewing region in which the first polarization direction changing means is adhered.

The polarizing glass device can be used to view, in a predetermined service condition thereof, an image displayed on the image display screen of the stereoscopic image display apparatus irrespective of the type of the stereoscopic image display apparatus. Consequently, improvement in compatibility is achieved, and reproduction of the cost can be anticipated.

Further, the polarizing eyeglass device eliminates such a trouble that a polarizing eyeglass device prepared intentionally for viewing of a stereoscopic image by a viewer is not compatible with a stereoscopic image display apparatus on which the image to be viewed is to be displayed. Consequently, improvement in convenience in use can be achieved.

In both of the polarizing eyeglass devices, the polarization direction changing means positioned on the opposite side to the image display screen of the stereoscopic image display apparatus with respect to the polarized light separation means does not have an influence upon whether or not the image displayed on the image display screen can be viewed.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 11 is a table illustrating the compatibility between the service conditions of the polarizing eyeglass device illustrated in FIGS. 6 to 9 and the types of the stereoscopic image display apparatus shown in FIGS. 1 to 4;

FIG. 16 is a perspective view showing the reversing mechanism of FIG. 15 but after the polarizing eyeglass device is reversed;

FIG. 18 is a perspective view showing the reversing mechanism of FIG. 17 but after the polarizing eyeglass device is reversed;

FIG. 19 is a perspective view showing a further reversing mechanism before a polarizing eyeglass device is reversed;

FIG. 27 is a table illustrating the compatibility between the service conditions of the polarizing eyeglass device illustrated in FIGS. 22 to 25 and the types of the stereoscopic image display apparatus shown in FIGS. 1 to 4;

DESCRIPTION OF THE PREFERRED EMBODIMENTS

First, a stereoscopic image display apparatus which displays an image to be viewed using a polarizing eyeglass device is described with reference to FIGS. 1 to 4.

Figure 1:
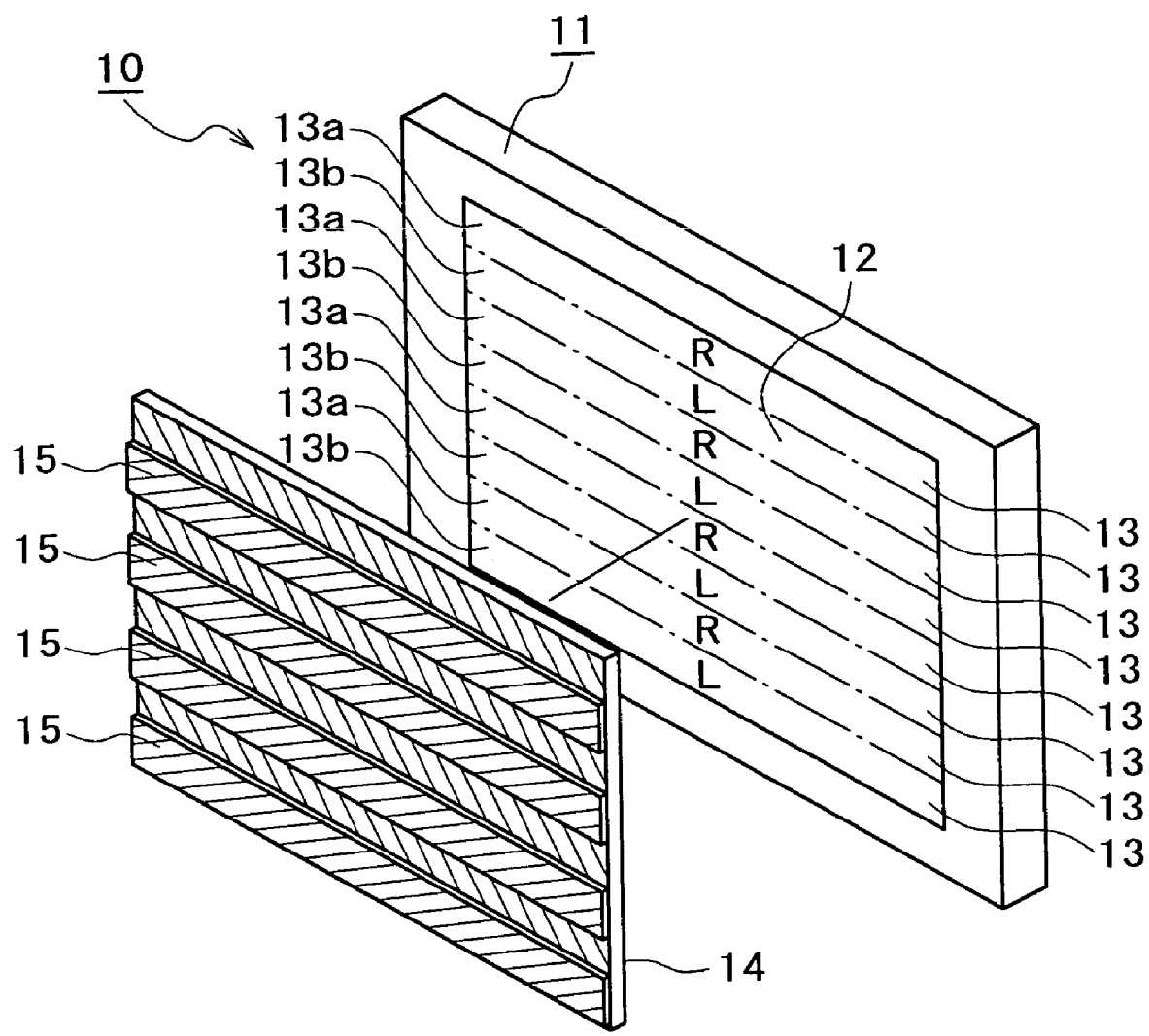
FIGS. 1 to 4 are exploded perspective views showing stereoscopic image display apparatus of the type I, type II, type III and type IX for use with a polarizing eyeglass device according to the present invention, respectively.

Referring first to FIG. 1, the stereoscopic image display apparatus 10 shown is, for example, a personal computer and has a display unit 11. An image display screen 12 having a liquid crystal panel is provided on the front face of the display unit 11 and has a plurality of horizontal areas 13 divided equally in a vertical direction. The horizontal areas 13 include first areas 13a formed as odd-numbered areas as counted, for example, from above and second areas 13b formed as even-numbered areas.

Different pieces of image information corresponding to the parallax of the two eyes are individually displayed in the first areas 13a and the second areas 13b. For example, images R for the right eye are individually displayed in the first areas 13a while images L for the left eye are individually displayed in the second areas 13b.

A polarizing plate 14 having, for example, a leftwardly upwardly inclined polarization angle is adhered to the image display screen 12. A phase difference plate 15 in the form of a half-wave plate is adhered in each of regions of a front face of the polarizing plate 14 which individually correspond to the second areas 13b. The phase difference plates 15 change the polarization direction of polarized light emitted from the second areas 13b through the polarizing plate 14 by 90°. Consequently, the polarization angle of the polarized light emitted from the second areas 13b through the polarizing plate 14 is changed to a rightwardly upwardly inclined polarization angle by the phase difference plates 15.

The stereoscopic image display apparatus 10 described above is of a type (hereinafter referred to as type I) wherein the polarizing plate 14 has a leftwardly upwardly inclined polarization angle and the right eye images R are displayed in the first areas 13a while the left eye images L are displayed in the second areas 13b. In addition to the type I, a type II, a type III and a type IV are available as the type of the stereoscopic image display apparatus.

Figure 2:
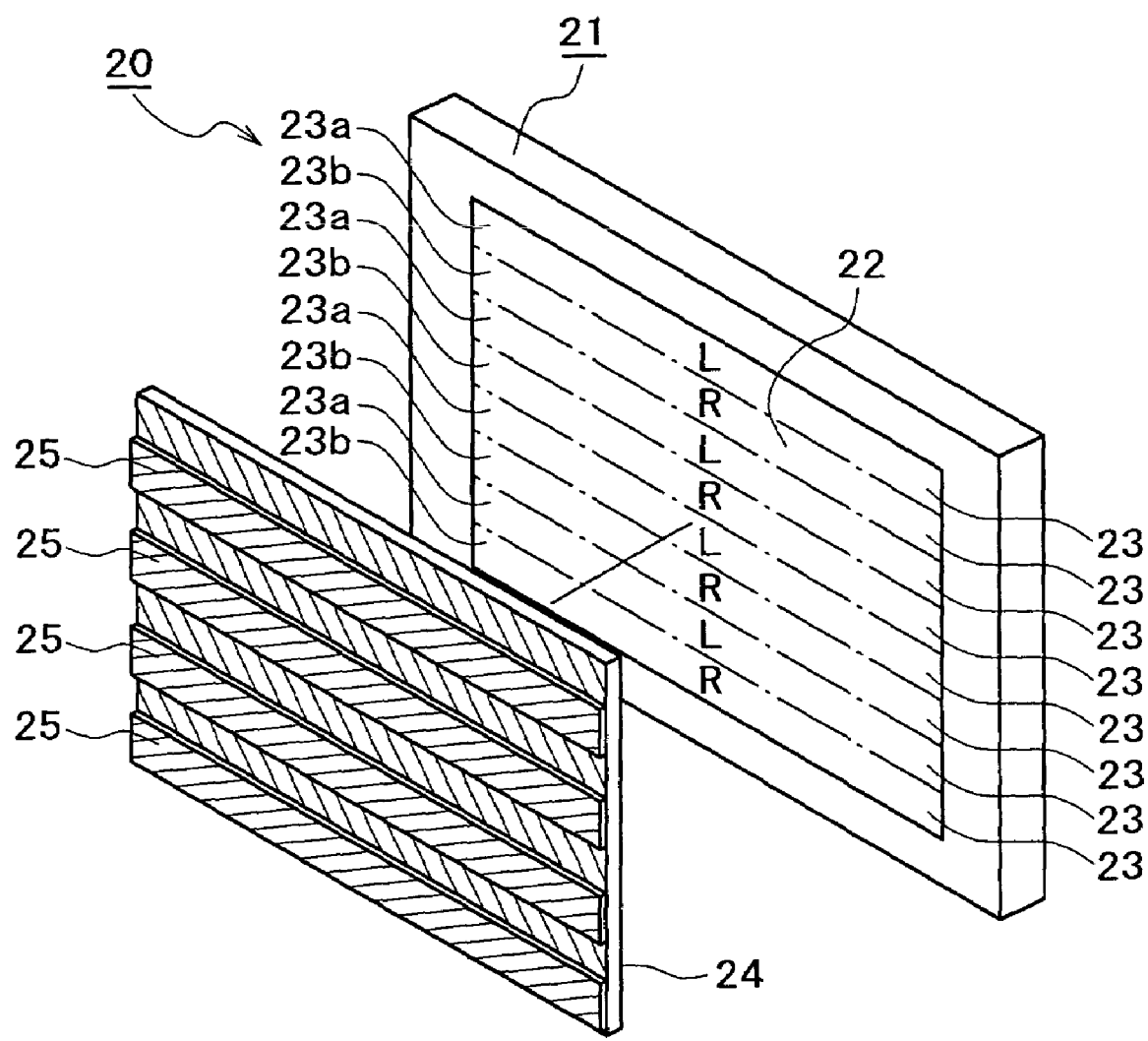

Referring to FIG. 2, the stereoscopic image display apparatus 20 of the type II includes a display unit 21 on a front face of which an image display screen 22 having a liquid crystal panel and having a plurality of horizontal areas 23 divided equally in a vertical direction is provided. Different pieces of image information corresponding to the parallax of the two eyes are individually displayed in first and second areas 23a and 23b of the horizontal areas 23. Left eye images L are displayed in the first areas 23a while right eye images R are displayed in the second areas 23b.

A polarizing plate 24 having a leftwardly upwardly inclined polarization angle is adhered to the image display screen 22. A phase difference plate 25 in the form of a half-wave plate is adhered in each of regions of a front face of the polarizing plate 24 which correspond to the second areas 23b. The phase difference plates 25 change the polarization direction of polarized light emitted from the second areas 23b through the polarizing plate 24 by 90°. Consequently, the polarization angle of the polarized light emitted from the second areas 23b through the polarizing plate 24 is changed to a rightwardly upwardly inclined polarization angle by the phase difference plates 25.

As described above, in the stereoscopic image display apparatus 20 of the type II, the polarizing plate 24 has a leftwardly upwardly inclined polarization angle, and the left eye images L are individually displayed in the first areas 23a while the right eye images R are individually displayed in the second areas 23b.

Figure 3:
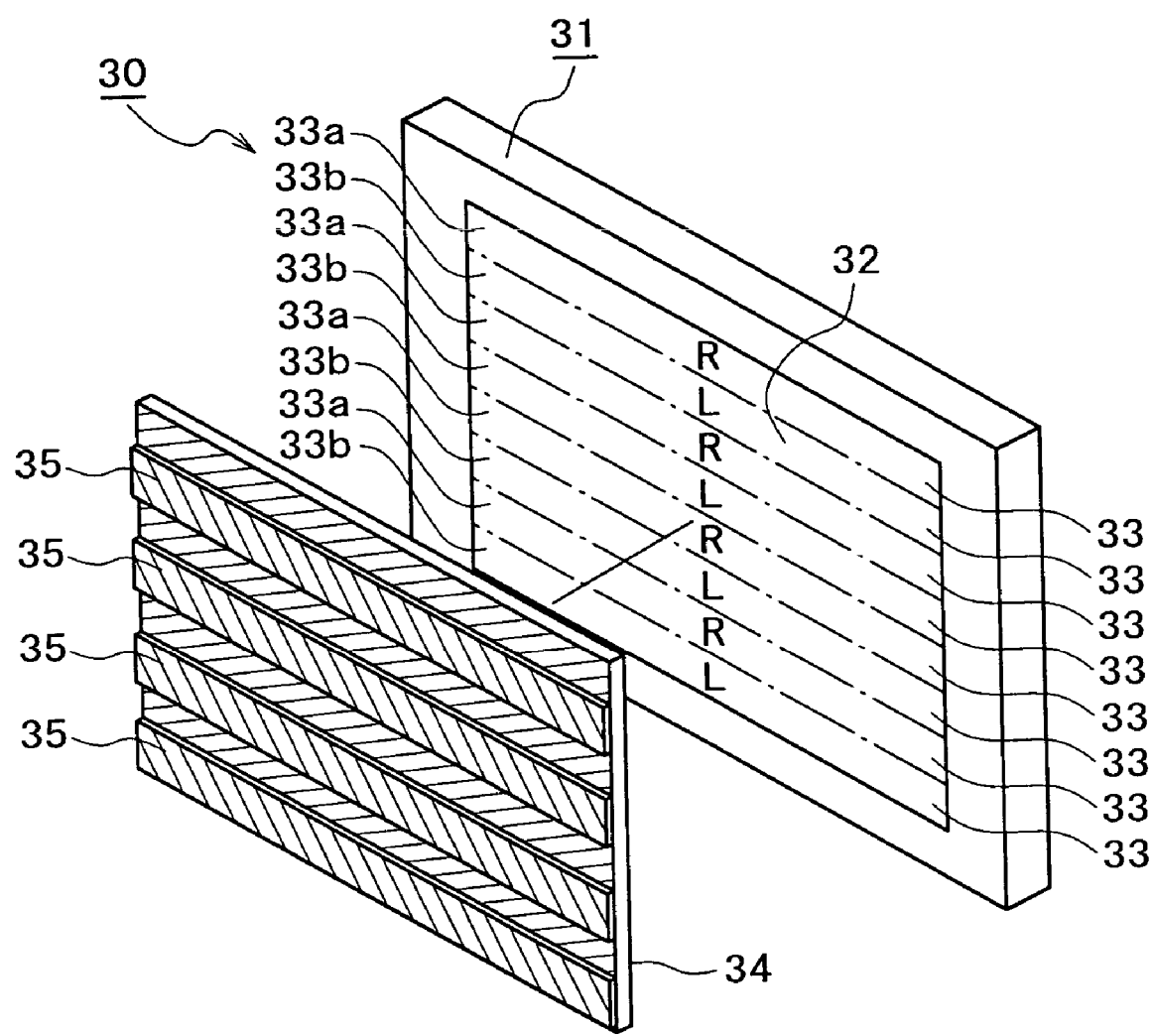

Referring to FIG. 3, the stereoscopic image display apparatus 30 of the type III includes a display unit 31 on a front face of which an image display screen 32 having a liquid crystal panel and having a plurality of horizontal areas 33 divided equally in a vertical direction is provided. Different pieces of image information corresponding to the parallax of the two eyes are individually displayed in first and second areas 33a and 33b of the horizontal areas 33. Right eye images R are individually displayed in the first areas 33a while left eye images L are individually displayed in the second areas 33b.

A polarizing plate 34 having a rightwardly upwardly inclined polarization angle is adhered to the image display screen 32. A phase difference plate 35 in the form of a half-wave plate is adhered in each of regions of a front face of the polarizing plate 34 which correspond to the second areas 33b. The phase difference plates 35 change the polarization direction of polarized light emitted from the second areas 33b through the polarizing plate 34 by 90°. Consequently, the polarization angle of the polarized light emitted from the second areas 33b through the polarizing plate 34 is changed to a leftwardly upwardly inclined polarization angle by the phase difference plates 35.

As described above, in the stereoscopic image display apparatus 30 of the type III, the polarizing plate 34 has a rightwardly upwardly inclined polarization angle, and the right eye images R are individually displayed in the first areas 33a while the left eye images L are individually displayed in the second areas 33b.

Figure 4:
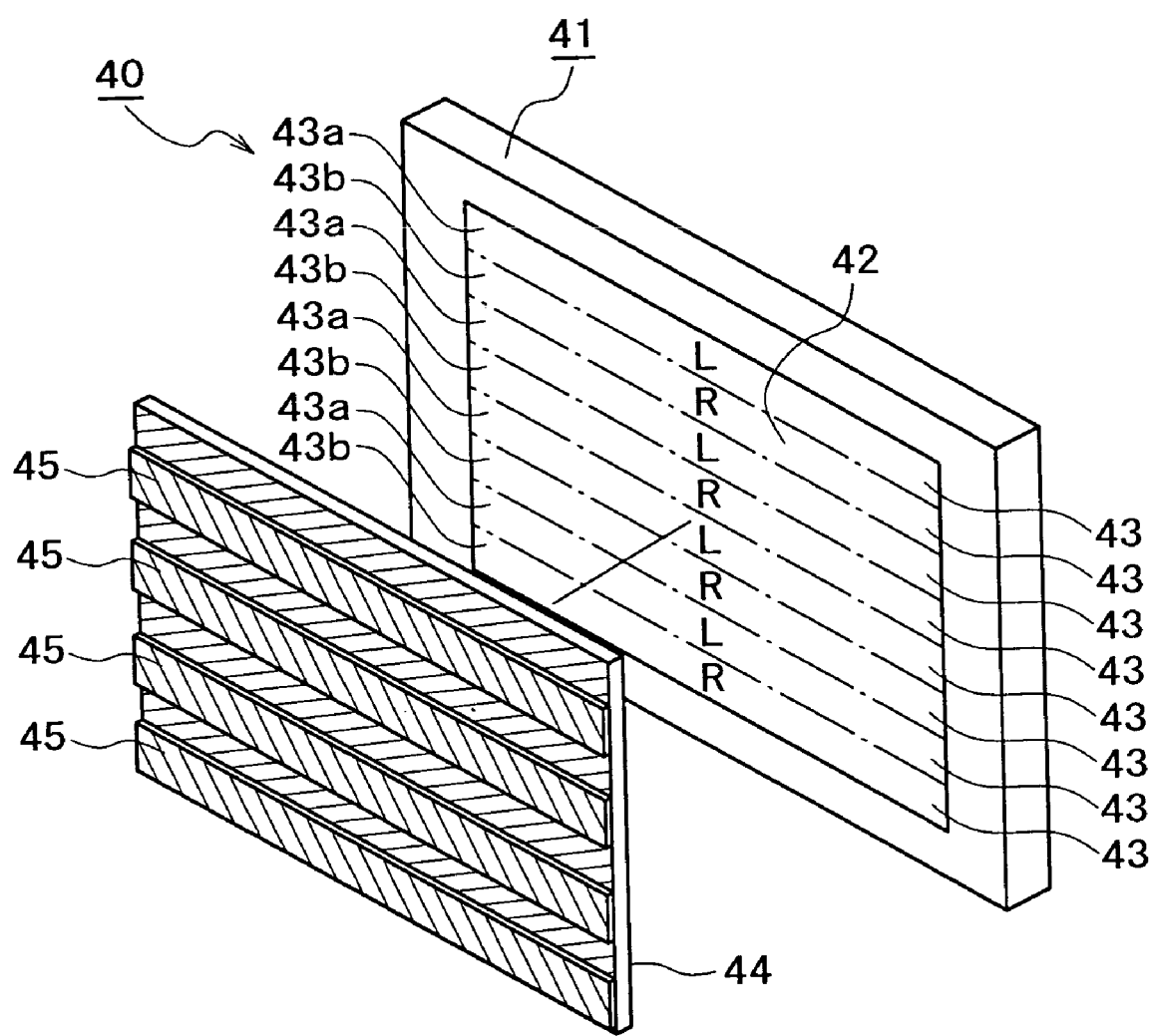

Referring to FIG. 4, the stereoscopic image display apparatus 40 of the type IV includes a display unit 41 on a front face of which an image display screen 42 having a liquid crystal panel and having a plurality of horizontal areas 43 divided equally in a vertical direction is provided. Different pieces of image information corresponding to the parallax of the two eyes are individually displayed in first and second areas 43a and 43b of the horizontal areas 43. Left eye images L are individually displayed in the first areas 43a while right eye images R are individually displayed in the second areas 43b.

A polarizing plate 44 having a rightwardly upwardly inclined polarization angle is adhered to the image display screen 42. A phase difference plate 45 in the form of a half-wave plate is adhered in each of regions of a front face of the polarizing plate 44 which correspond to the second areas 43b. The phase difference plates 45 change the polarization direction of polarized light emitted from the second areas 43b through the polarizing plate 44 by 90°. Consequently, the polarization angle of the polarized light emitted from the second areas 43b through the polarizing plate 44 is changed to a leftwardly upwardly inclined polarization angle by the phase difference plates 45.

As described above, in the stereoscopic image display apparatus 40 of the type IV, the polarizing plate 44 has a rightwardly upwardly inclined polarization angle, and the left eye images L are individually displayed in the first areas 43a while the right eye images R are individually displayed in the second areas 43b.

Now, a polarizing eyeglass device according to a first embodiment of the present invention is described.

Figure 5:
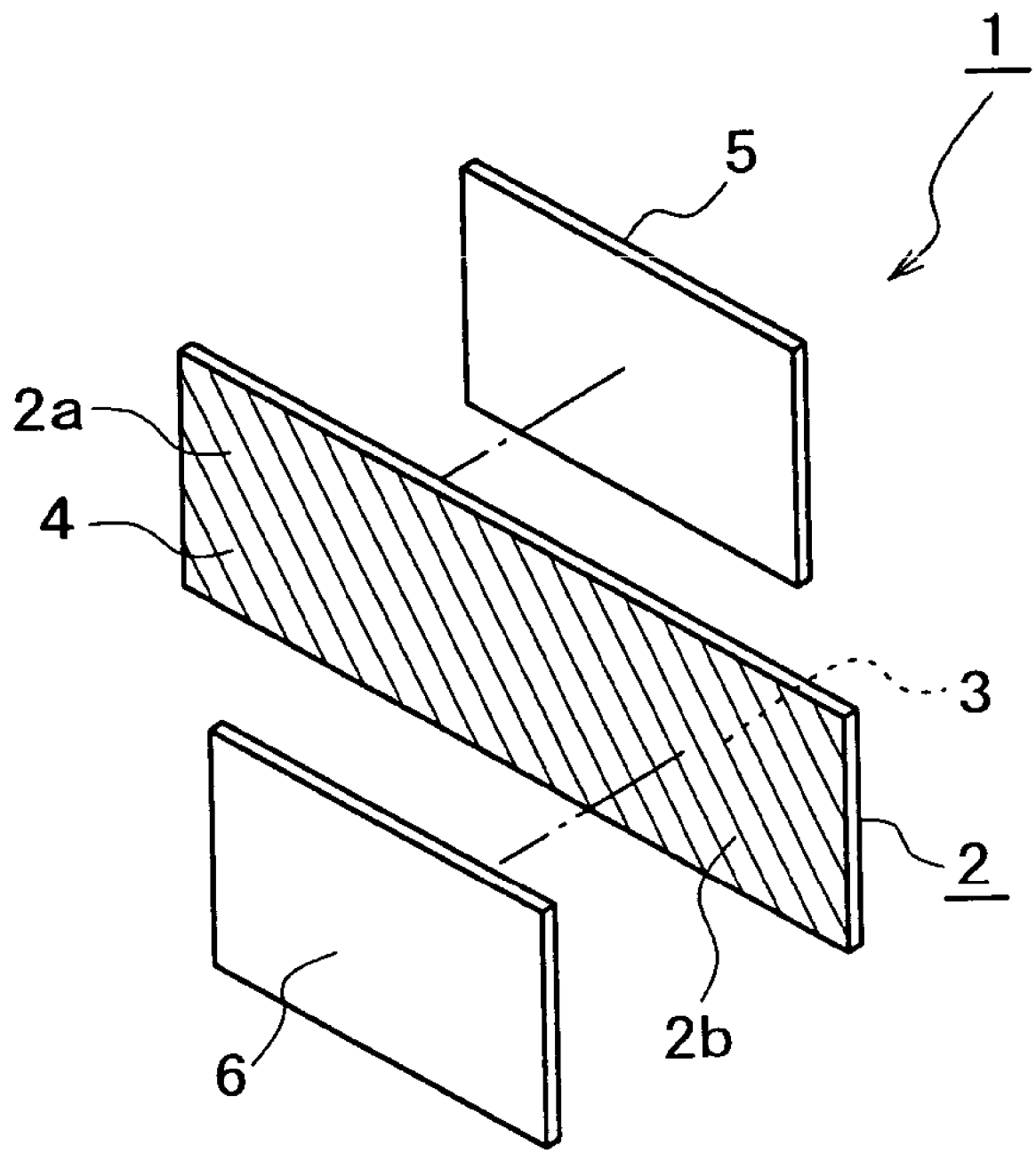
FIG. 5 is an exploded perspective view showing a polarizing eyeglass device to which the present invention is applied.
Figure 6:
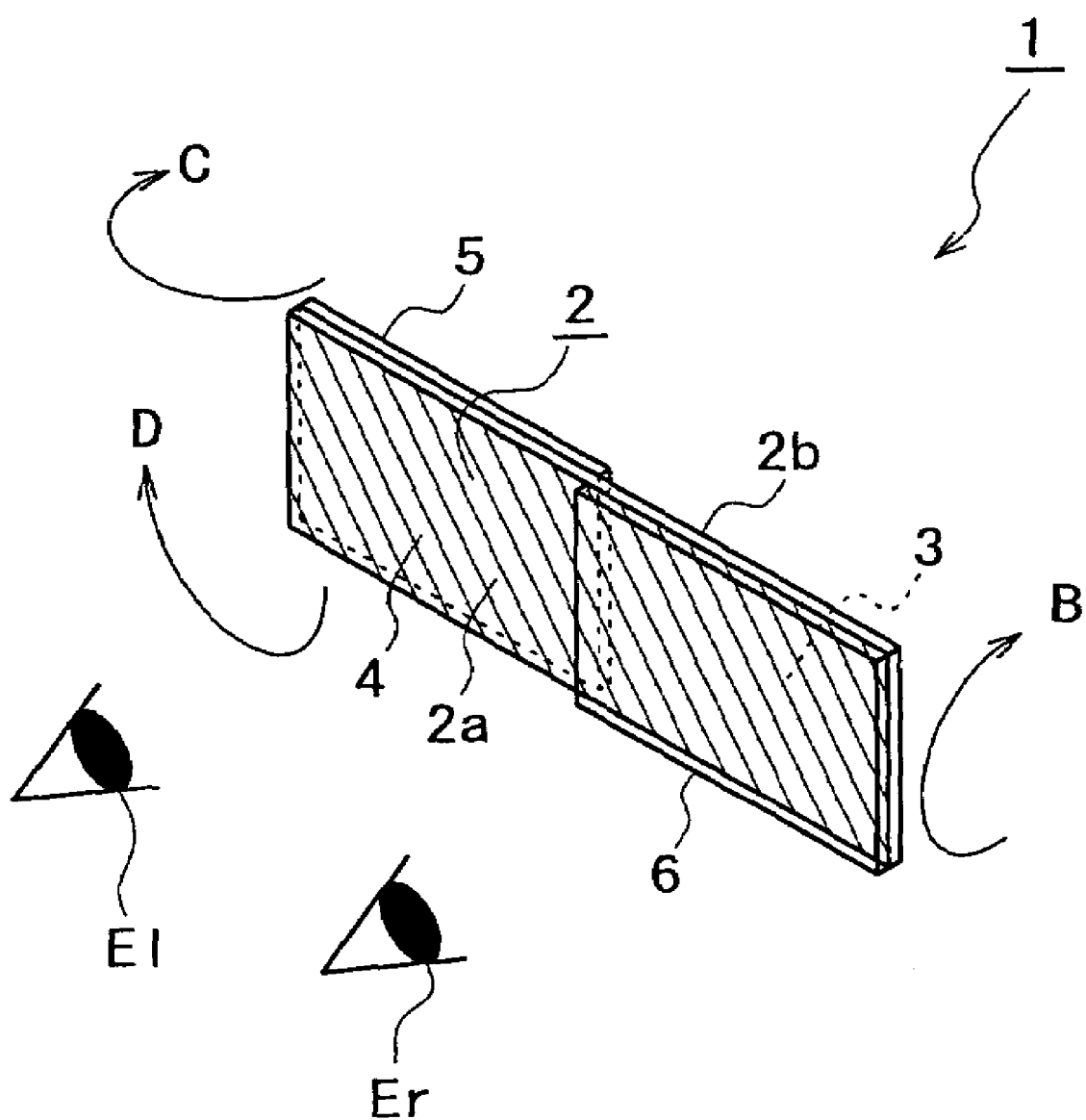
FIGS. 6 to 9 are perspective views illustrating service conditions A, B, C and D of the polarizing eyeglass device of FIG. 5, respectively.

Referring first to FIGS. 5 and 6, the polarizing eyeglass device 1 shown includes a polarized light separation means 2 in the form of a horizontally elongated plate having, for example, a leftwardly upwardly inclined polarization angle. For example, a polarizing plate is used for the polarized light separation means 2. The polarized light separation means 2 has a function of separating particular polarized light. For example, a face of the polarized light separation means 2 directed to the display unit 11, 21, 31 or 41 of the stereoscopic image display apparatus 10, 20, 30 or 40 and another face directed in the opposite direction are formed as a first face 3 and a second face 4, respectively.

The polarized light separation means 2 is divided into left and right halves with reference to a central portion in the leftward and rightward direction thereof. One of the left and right halves serves as a first viewing region 2a for viewing an image with one of the two eyes, that is, with the left eye El or the right eye Er. Meanwhile, the other half serves as a second viewing region 2b for viewing an image with the other eye, that is, with the right eye Er or the left eye El.

For example, a first polarization direction changing means 5 is adhered to the first face 3 of the polarized light separation means 2 in the first viewing region 2a. The first polarization direction changing means 5 has a function of changing the polarization direction of polarized light incoming thereto by 90°. For example, a half-wave plate is used for the first polarization direction changing means 5.

A second polarization direction changing means 6 is adhered to the second face 4 of the polarized light separation means 2 in the second viewing region 2b. Also the second polarization direction changing means 6 has a function of changing the polarization direction of incoming polarized light by 90° similarly to the first polarization direction changing means 5. For example, a half-wave plate is used for the second polarization direction changing means 6.

The first and second polarization direction changing means 5 and 6 have optical axes orthogonal to those of the phase difference plates 15, 25, 35 or 45 of the stereoscopic image display apparatus 10, 20, 30 or 40 so that the phase difference of the phase difference plates 15, 25, 35 or 45 is canceled by the first and second polarization direction changing means 5 and 6.

The polarizing eyeglass device 1 can be used in such a service condition as seen in FIG. 6 (the service condition is hereinafter referred to as "service condition A"). Referring to FIG. 6, in the service condition A illustrated, the polarized light separation means 2 has a leftwardly upwardly inclined polarization direction. Further, the first polarization direction changing means 5 is positioned on the left eye El side and on the opposite side of the viewer with respect to the polarized light separation means 2. Meanwhile, the second polarization direction changing means 6 is positioned on the right eye Er side and on the side facing the viewer with respect to the polarized light separation means 2. In the service condition A described, the polarizing eyeglass device 1 operates in the following manner.

When polarized light having a leftwardly upwardly inclined polarization angle is introduced into the first polarization direction changing means 5, the left eye El of the viewer who looks through the polarized light separation means 2 cannot view the image. This is because the polarization direction of the polarized light is changed by 90° to a rightwardly upwardly inclined polarization direction by the first polarization direction changing means 5. However, when polarized light having a rightwardly upwardly inclined polarization angle is introduced into the first polarization direction changing means 5, the left eye El can view the image. This is because the polarization direction of the polarized light is changed by 90° to a leftwardly upwardly inclined polarization direction by the first polarization direction changing means 5.

Meanwhile, for the right eye Er of the viewer who looks through the polarized light separation means 2, since the second polarization direction changing means 6 is positioned on the side facing the viewer, even if the polarization direction is changed by 90° by the second polarization direction changing means 6, this does not have any influence upon viewing. In particular, if polarized light having a rightwardly upwardly inclined polarization angle is introduced into the polarized light separation means 2, then the right eye Er cannot view the image. However, if polarized light having a leftwardly upwardly inclined polarization angle is introduced into the polarized light separation means 2, then the right eye Er can view the image.

Figure 7:
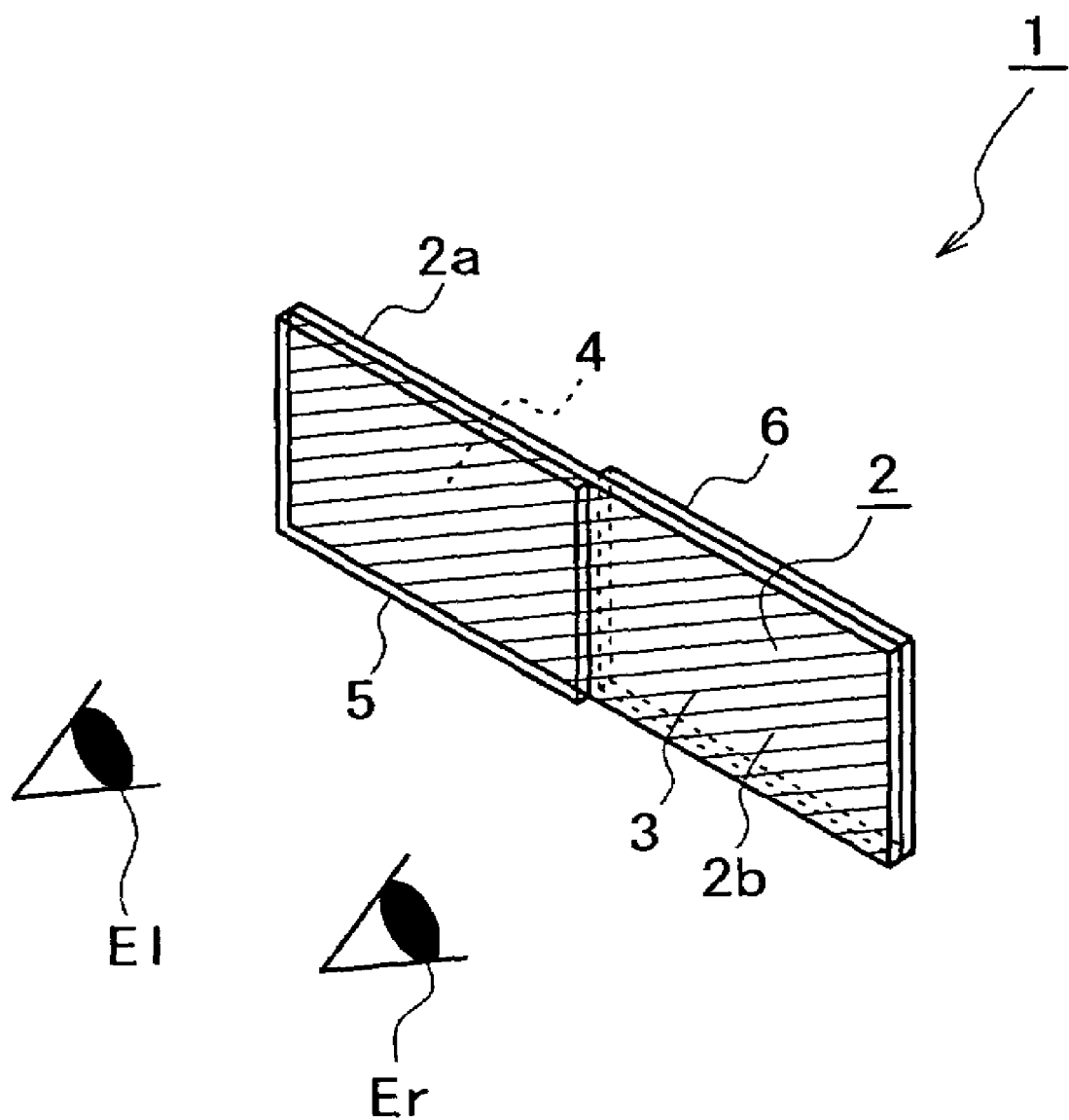
Figure 8:
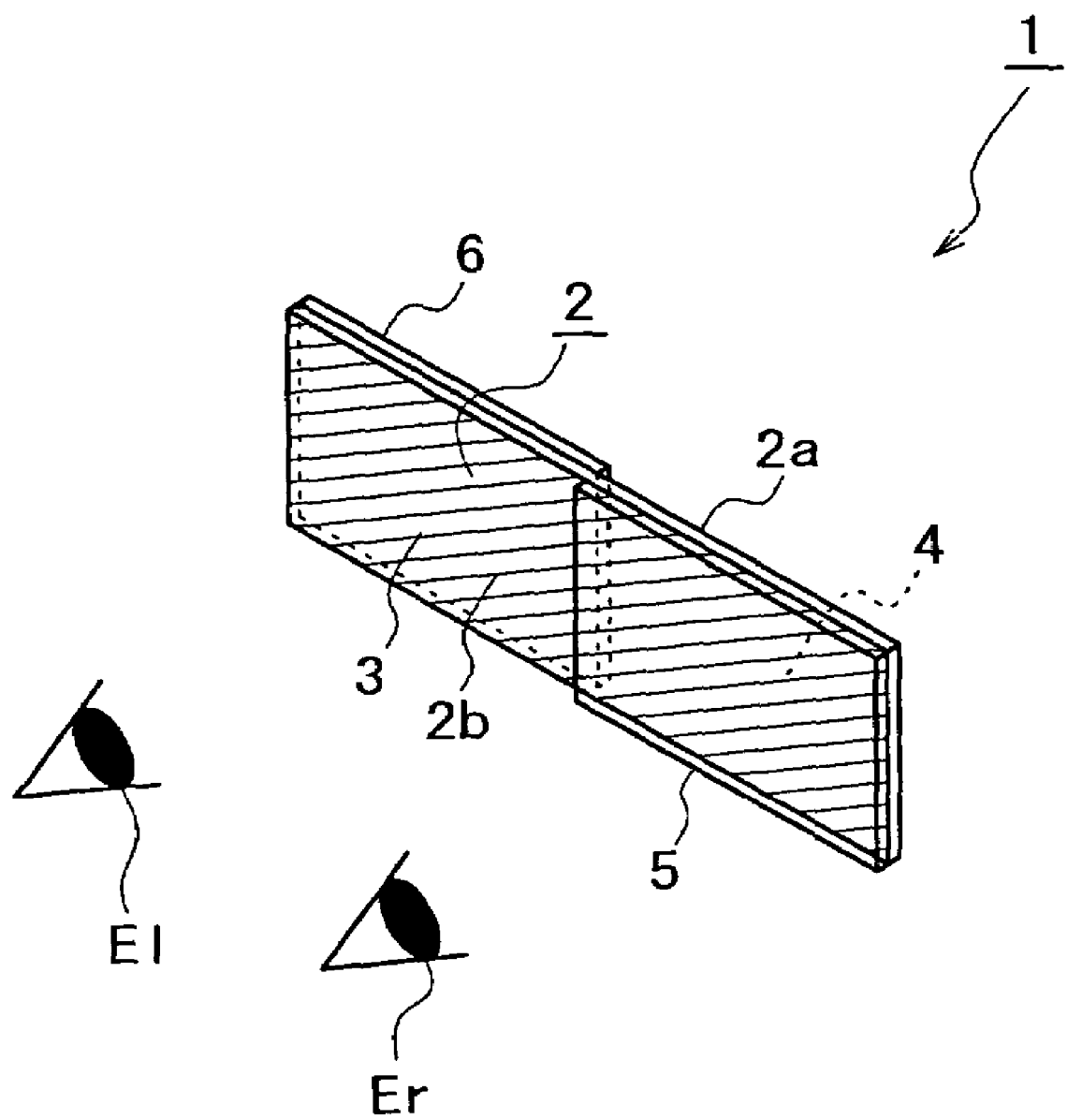
Figure 9:
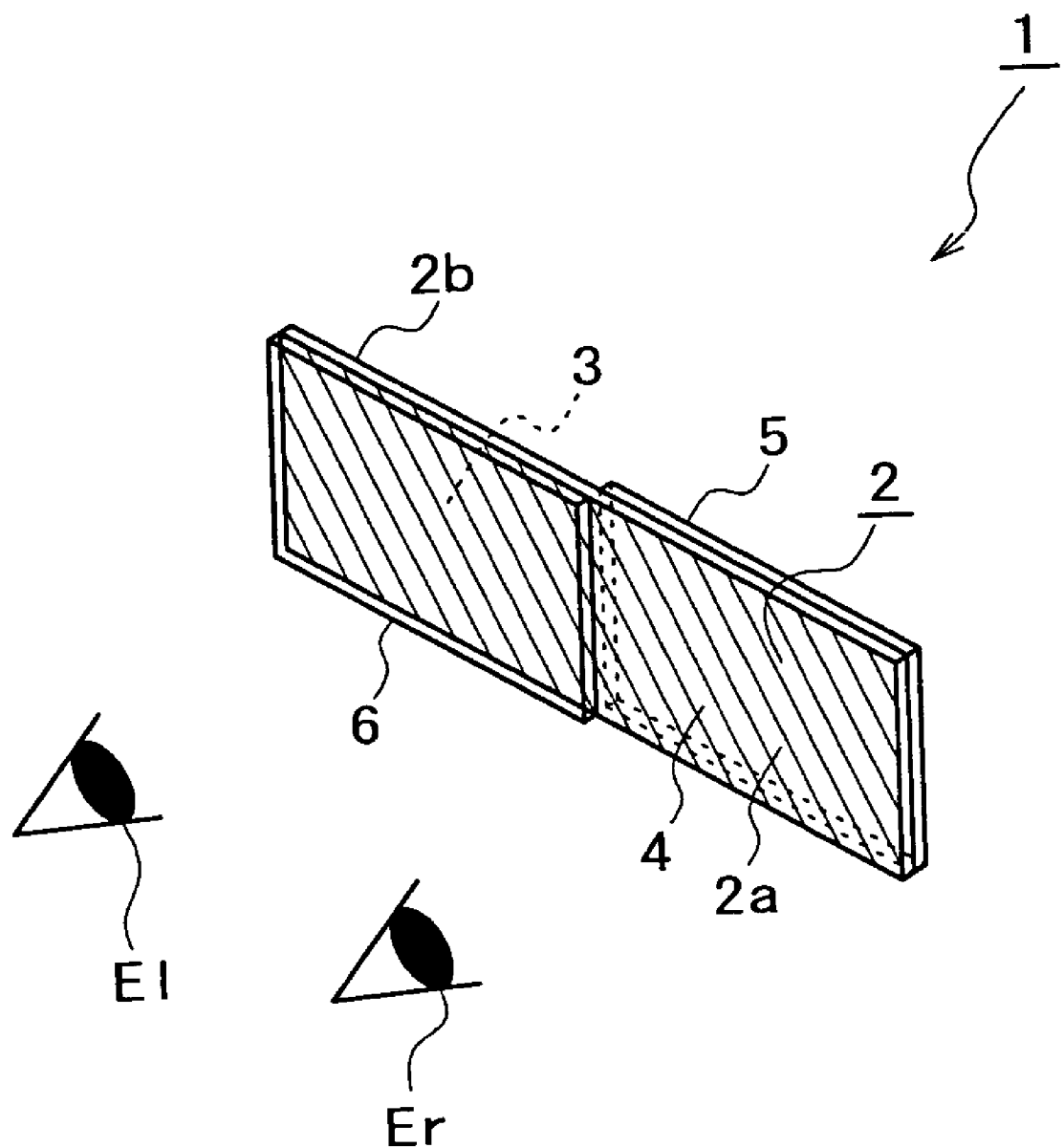

The polarizing eyeglass device 1 can be used in three service conditions including a service condition B, another service condition C and a further service condition D, as seen in FIGS. 7 to 9, respectively, in addition to the service condition A described above.

FIG. 7 illustrates the service condition B. Referring to FIG. 7, the service condition B is a condition after the polarizing eyeglass device 1 in the service condition A is reversed, for example, in the direction indicated by an arrow mark B in FIG. 6 such that an upper edge and a lower edge of the polarized light separation means 2 are positioned on the respective opposite sides, that is, on the lower and upper sides. Further, the polarized light separation means 2 has a rightwardly upwardly inclined polarization angle.

In the service condition B, the first polarization direction changing means 5 is positioned on the left eye El side and on the side facing the viewer with respect to the polarized light separation means 2. Meanwhile, the second polarization direction changing means 6 is positioned on the right eye Er side and on the opposite side of the viewer with respect to the polarized light separation means 2. Further, the polarized light separation means 2 has a rightwardly upwardly inclined polarization angle.

For the left eye El of the viewer who looks through the polarized light separation means 2, the first polarization direction changing means 5 is positioned on the side facing the viewer. Therefore, even if the polarization direction is changed by 90° by the first polarization direction changing means 5, this does not have any influence upon viewing. In particular, if polarized light having a leftwardly upwardly inclined polarization angle is introduced into the polarized light separation means 2, then the left eye El cannot view the image. However, if polarized light having a rightwardly upwardly inclined polarization angle is introduced into the polarized light separation means 2, then the left eye El can view the image.

In the meantime, when polarized light having a rightwardly upwardly inclined polarization angle is introduced into the second polarization direction changing means 6, the right eye Er of the viewer who looks through the polarized light separation means 2 cannot view the image. This is because the polarization direction of the polarized light is changed by 90° to a leftwardly upwardly inclined polarization direction by the second polarization direction changing means 6. However, when polarized light having a leftwardly upwardly inclined polarization angle is introduced into the second polarization direction changing means 6, the right eye Er can view the image. This is because the polarization direction of the polarized light is changed by 90° to a rightwardly upwardly inclined polarization direction by the second polarization direction changing means 6.

FIG. 8 illustrates the service condition C. Referring to FIG. 8, the service condition C is a condition after the polarizing eyeglass device 1 in the service condition A is reversed, for example, in the direction indicated by an arrow mark C in FIG. 6 such that a left edge and a right edge of the polarized light separation means 2 are positioned on the respective opposite sides, that is, on the right and left sides. The polarized light separation means 2 has a rightwardly upwardly inclined polarization angle.

In the service condition C, the second polarization direction changing means 6 is positioned on the left eye El side and on the opposite side of the viewer with respect to the polarized light separation means 2. Meanwhile, the first polarization direction changing means 5 is positioned on the right eye Er side and on the side facing the viewer with respect to the polarized light separation means 2. Further, the polarized light separation means 2 has a rightwardly upwardly inclined polarization angle.

When polarized light having a rightwardly upwardly inclined polarization angle is introduced into the second polarization direction changing means 6, the left eye El of the viewer who looks through the polarized light separation means 2 cannot view the image. This is because the polarization direction of the polarized light is changed by 90° to a leftwardly upwardly inclined polarization direction by the second polarization direction changing means 6. However, when polarized light having a leftwardly upwardly inclined polarization angle is introduced into the second polarization direction changing means 6, the left eye El can view the image. This is because the polarization direction of the polarized light is changed by 90° to a rightwardly upwardly inclined polarization direction by the second polarization direction changing means 6.

Meanwhile, for the right eye Er of the viewer who looks through the polarized light separation means 2, the first polarization direction changing means 5 is positioned on the side facing the viewer. Therefore, even if the polarization direction is changed by 90° by the first polarization direction changing means 5, this does not have any influence upon viewing. In particular, if polarized light having a leftwardly upwardly inclined polarization angle is introduced into the polarized light separation means 2, then the right eye Er cannot view the image. However, if polarized light having a rightwardly upwardly inclined polarization angle is introduced into the polarized light separation means 2, then the right eye Er can view the image.

FIG. 9 illustrates the service condition D. Referring to FIG. 9, the service condition D is a condition after the polarizing eyeglass device 1 in the service condition A is reversed, for example, in the direction indicated by an arrow mark D in FIG. 6 such that a left edge and a right edge of the polarized light separation means 2 are positioned on the respective opposite sides, that is, on the right and left sides and an upper edge and an upper edge and a lower edge of the polarized light separation means 2 are positioned on the respective opposite sides, that is, on the lower and upper sides, respectively. The polarized light separation means 2 has a leftwardly upwardly inclined polarization angle.

In the service condition D, the second polarization direction changing means 6 is positioned on the left eye El side and on the side facing the viewer with respect to the polarized light separation means 2. Meanwhile, the first polarization direction changing means 5 is positioned on the right eye Er side and on the opposite side of the viewer with respect to the polarized light separation means 2. Further, the polarized light separation means 2 has a leftwardly upwardly inclined polarization angle.

For the left eye El of the viewer who looks through the polarized light separation means 2, the second polarization direction changing means 6 is positioned on the side facing the viewer. Therefore, even if the polarization direction is changed by 90° by the second polarization direction changing means 6, this does not have any influence upon viewing. In particular, if polarized light having a rightwardly upwardly inclined polarization angle is introduced into the polarized light separation means 2, then the left eye El cannot view the image. However, if polarized light having a leftwardly upwardly inclined polarization angle is introduced into the polarized light separation means 2, then the left eye El can view the image.

Meanwhile, when polarized light having a leftwardly upwardly inclined polarization angle is introduced into the first polarization direction changing means 5, the right eye Er of the viewer who looks through the polarized light separation means 2 cannot view the image. This is because the polarization direction of the polarized light is changed by 90° to a rightwardly upwardly inclined polarization direction by the first polarization direction changing means 5. However, when polarized light having a rightwardly upwardly inclined polarization angle is introduced into the first polarization direction changing means 5, the right eye Er can view the image. This is because the polarization direction of the polarized light is changed by 90° to a leftwardly upwardly inclined polarization direction by the first polarization direction changing means 5.

Figure 10:
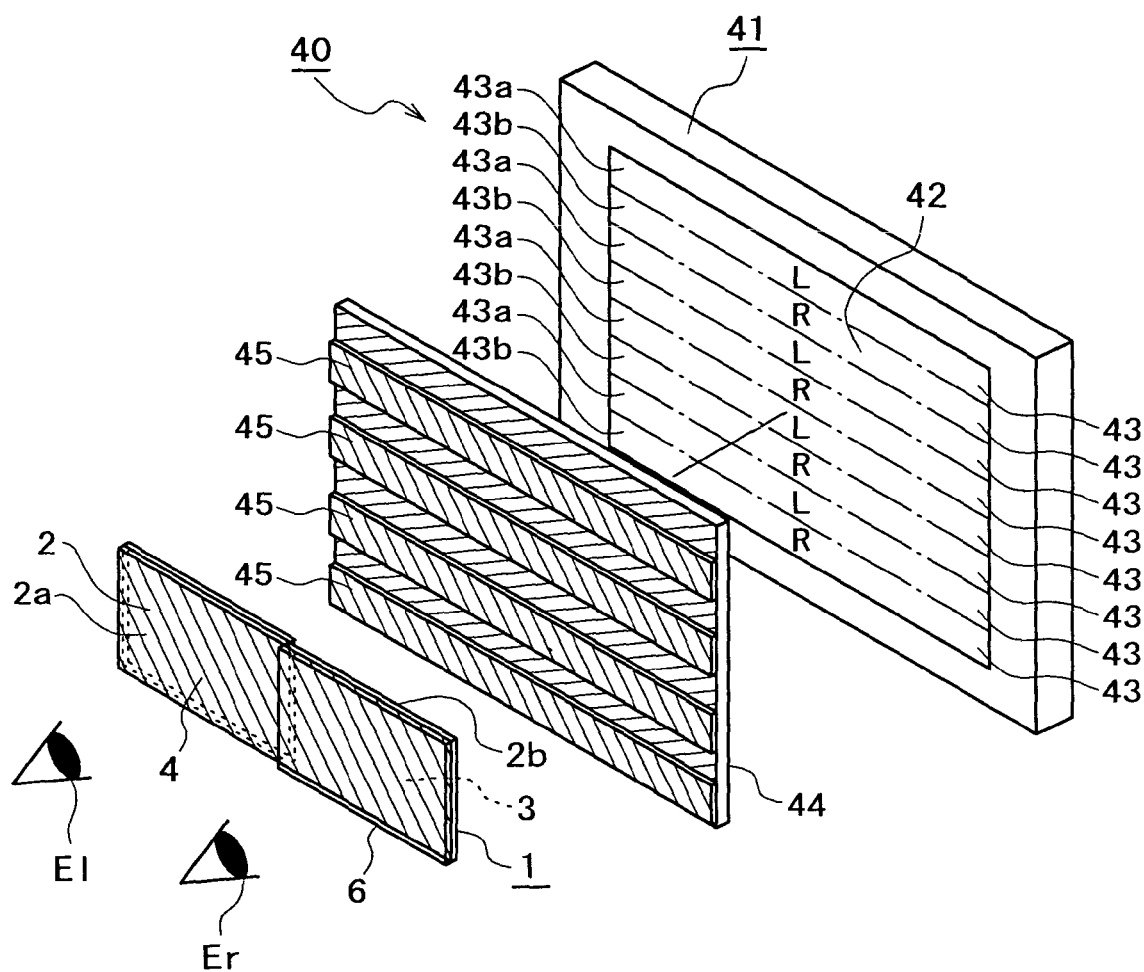
FIG. 10 is a perspective view, partly exploded, showing an example of a manner of use of the polarizing eyeglass device of FIG. 5.

Now, an example of manner of use of the polarizing eyeglass device 1 is described with reference to FIG. 10. Referring to FIG. 10, in the manner of use illustrated, an image displayed on the image display screen 42 of the stereoscopic image display apparatus 40 of the type IV is viewed in the service condition A.

On the image display screen 42 of the stereoscopic image display apparatus 40, left eye images L are displayed in the first areas 43a while right eye images R are displayed in the second areas 43b. The polarizing plate 44 has a rightwardly upwardly inclined polarization angle.

When the image display screen 42 is viewed with the polarizing eyeglass device 1 in the service condition A, for the left eye El of the viewer who looks through the polarized light separation means 2, the polarization angle of polarized light for the right eye images R emitted from the second areas 43b through the polarizing plate 44 is rotated approximately by 90° by the phase difference plates 45 positioned between the polarizing plate 44 and the polarized light separation means 2 which have polarization angles orthogonal to each other. However, the coordinate axis is rotated by 90° by the first polarization direction changing means 5 to cancel the phase difference. This is equivalent to a situation that the phase difference plates 45 are not present. Therefore, the left eye El cannot view the right eye images R because of the orthogonal polarization conditions of the polarizing plate 44 and the polarized light separation means 2. Further, the light is intercepted fully and does not cause crosstalk. In contrast, the left eye images L can be viewed by the left eye El. This is because the polarization direction of the polarized light emitted from the second areas 43b through the polarizing plate 44 is changed by 90° by the first polarization direction changing means 5 interposed between the polarizing plate 44 and the polarized light separation means 2 which have polarization angles orthogonal to each other.

Meanwhile, the right eye Er of the viewer who looks through the polarized light separation means 2 cannot view the left eye images L because the polarization angles of the polarizing plate 44 and the polarized light separation means 2 are orthogonal to each other. In contrast, the right eye Er can view the right eye images R. This is because, even if the polarization direction of the polarized light is changed by 90° by the second polarization direction changing means 6 positioned on the side facing the viewer, the polarization direction of the polarized light emitted from the second areas 43b through the polarizing plate 44 is changed by 90° by the phase difference plates 45 interposed between the polarizing plate 44 and the polarized light separation means 2 which have polarization angles orthogonal to each other.

FIG. 11 illustrates the compatibility between the service conditions A, B, C and D of the polarizing eyeglass device 1 and the types of the stereoscopic image display apparatus, that is, the type I to type IV. In FIG. 11, "∘" indicates that an image can be viewed, and "x" indicates that an image cannot be viewed. It is to be noted that, where the polarization directions of the polarizing plate of the stereoscopic image display apparatus and the polarized light separation means 2 of the polarizing eyeglass device 1 are same as each other, polarized lights in a parallel direction are changed into polarized lights in an orthogonal direction by the phase difference plates. However, due to the wavelength dependency of the phase difference plate that exhibits a different rotational angle depending upon the wavelength, the polarized lights may not be fully orthogonal to each other but the left eye El or the right eye Er may view an image of the opposite side because of failure in interception of the image. Such a case as just described is represented by "Δ" in FIG. 11.

As seen from FIG. 11, an image displayed on any of the stereoscopic image display apparatus of the types I to IV can be viewed in a certain service condition of the polarizing eyeglass device 1. Discrimination of in which service condition the polarizing eyeglass device 1 can be used for each of the types I to IV can be performed by reversing the polarizing eyeglass device 1 in an arbitrary service condition in an arbitrary direction (for example, in the direction indicated by the arrow mark B, C or D in FIG. 6) and confirming whether or not an image can be viewed with both of the two eyes El and Er.

As described above, the polarizing eyeglass device 1 can be used in a certain service condition to view an image displayed on any of the image display screens 12, 22, 32 and 42 of the stereoscopic image display apparatus 10, 20, 30 and 40 of the various types. Therefore, improvement in compatibility can be achieved, and the cost can be reduced as much.

Further, the polarizing eyeglass device 1 eliminates such a trouble that a polarizing eyeglass device prepared intentionally for viewing a stereoscopic image by a viewer is not compatible with a stereoscopic image display apparatus on which the image to be viewed is to be displayed. Consequently, improvement in convenience in use can be achieved.

The polarizing eyeglass device 1 described above includes the polarized light separation means 2 to which the first polarization direction changing means 5 and the second polarization direction changing means 6 are adhered. However, it is possible to cover the first polarization direction changing means 5 and the second polarization direction changing means 6 with a transparent protective layer in order to prevent exfoliation of them from the polarized light separation means 2. The modified polarizing eyeglass device of the type just described is shown as an polarizing eyeglass device 1A in FIGS. 12 to 14.

Figure 12:
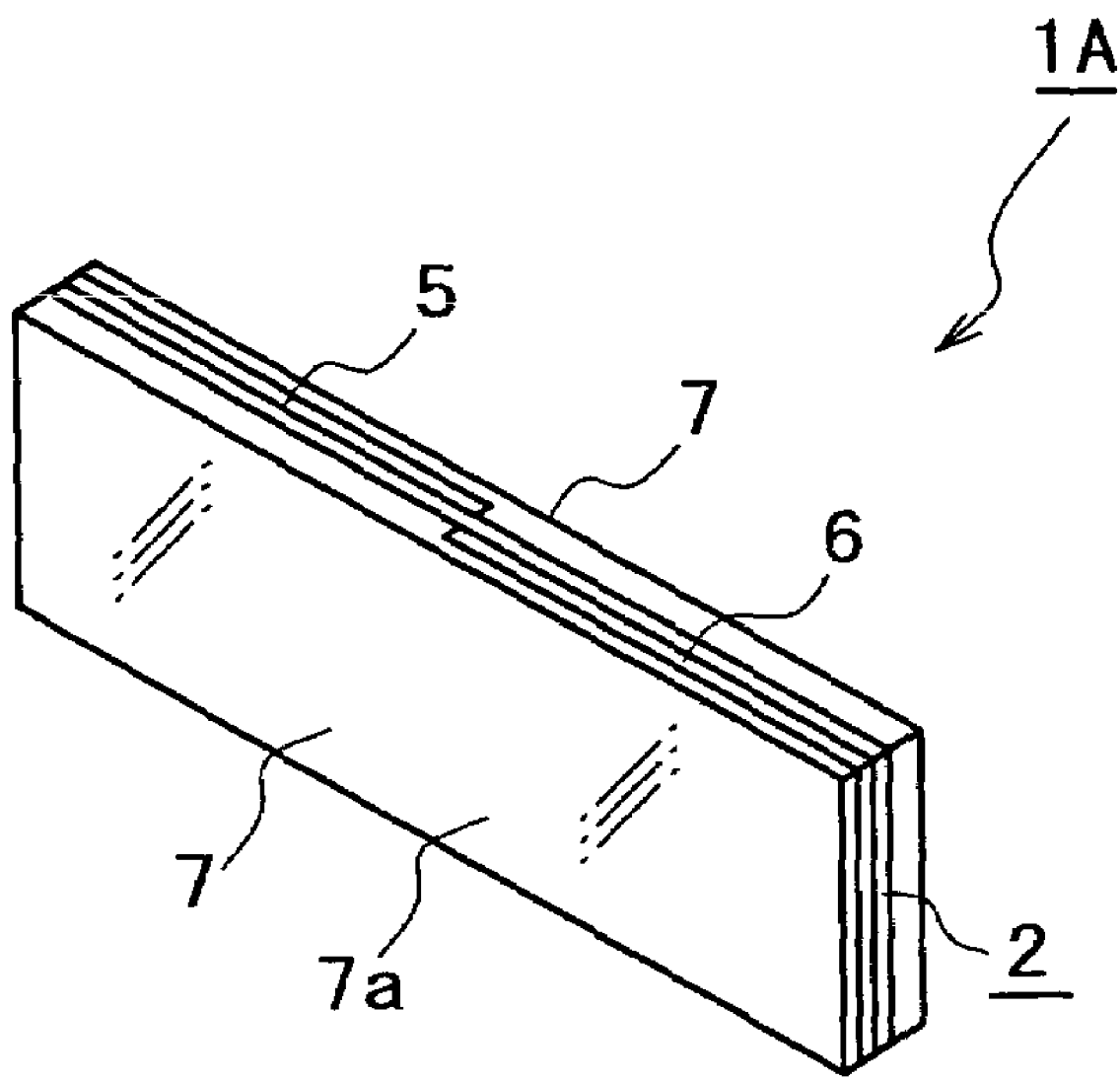
FIG. 12 is a perspective view showing a modified polarizing eyeglass device covered with a transparent protective layer.
Figure 13:
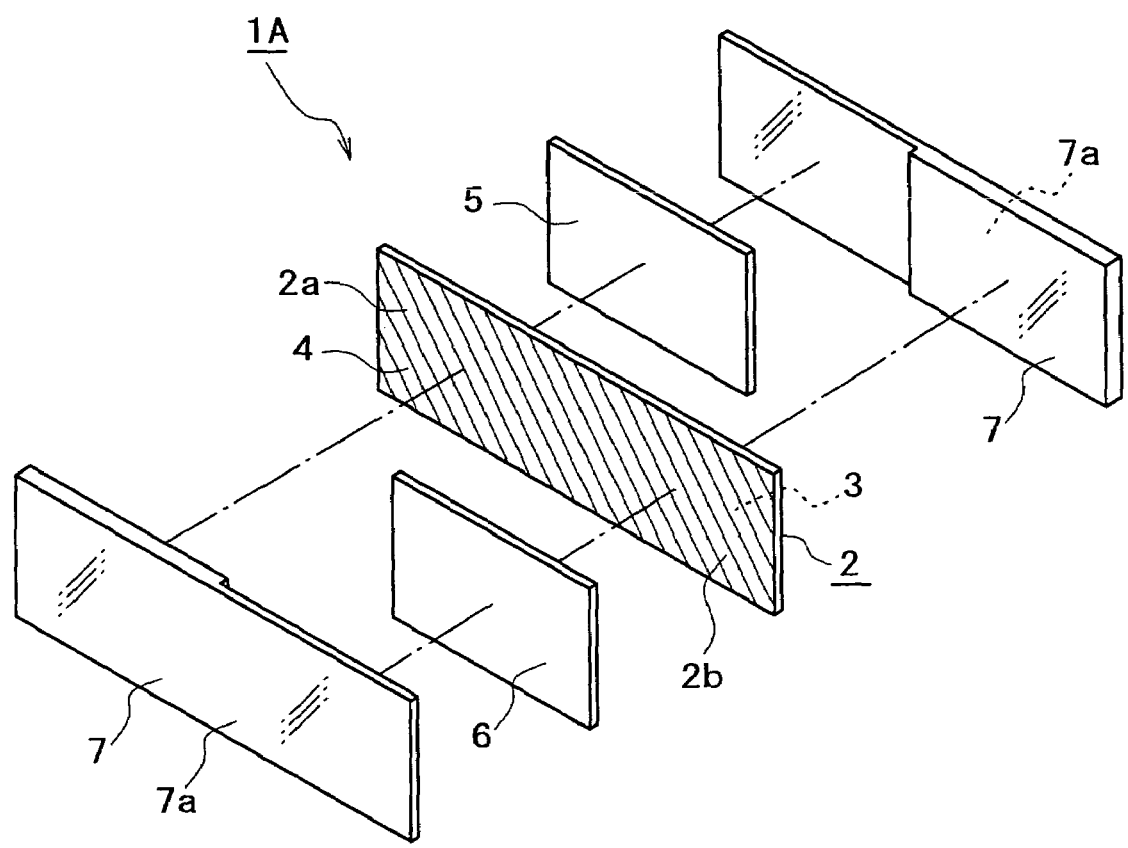
FIG. 13 is an exploded perspective view of the polarizing eyeglass device of FIG. 12.
Figure 14:
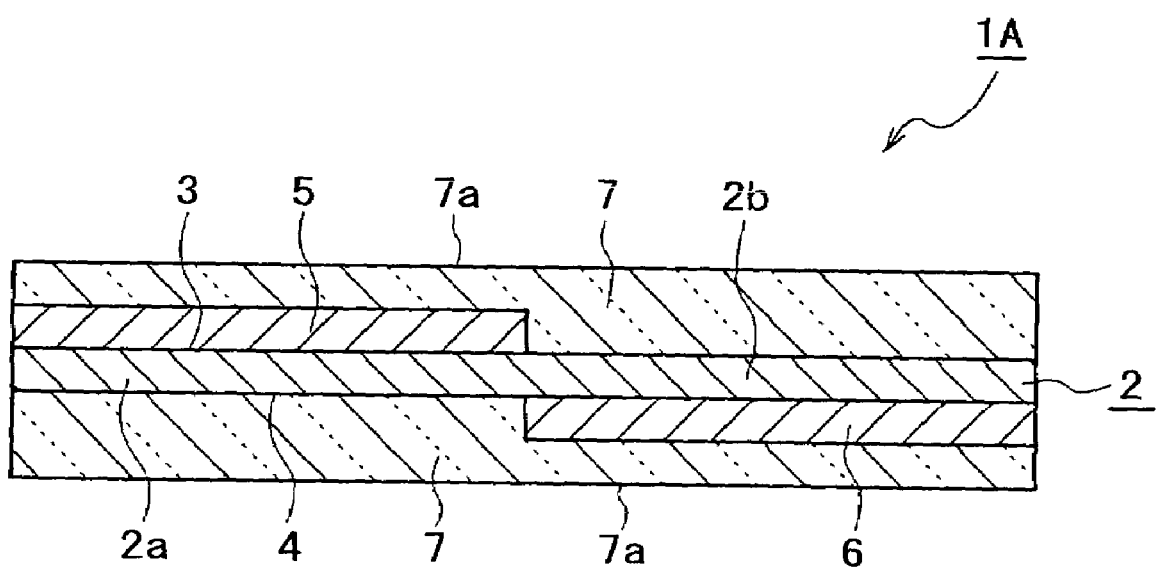
FIG. 14 is an enlarged sectional view of the polarizing eyeglass device of FIG. 12.

Referring to FIGS. 12 to 14, the polarizing eyeglass device 1A includes transparent protective layers 7 provided on the first face 3 and the second face 4 of the polarized light separation means 2 such that they cover the first polarization direction changing means 5 and the second polarization direction changing means 6, respectively. The transparent protective layers 7 have outer faces 7a formed as flat faces.

The transparent protective layers 7 are preferably formed from a material which is low in birefringence and high in moisture resistance, abrasive resistance, light resistance and chemical resistance. As a material of the type mentioned, for example, an acrylic resin such as a polymethyl methacrylate resin, polycarbonate and polypropylene can be used. Also silicon rubber or a like material can be used.

Where the transparent protective layers 7 are provided in this manner, exfoliation of the first polarization direction changing means 5 and the second polarization direction changing means 6 from the polarized light separation means 2 can be prevented. Besides, deterioration of the first polarization direction changing means 5 and the second polarization direction changing means 6 by moisture absorption or some other cause can be prevented.

Subsequently, reversing mechanisms for reversing the polarizing eyeglass device 1 or 1A so that it may be placed into a desired service condition are described with reference to FIGS. 15 to 20.

Figure 15:
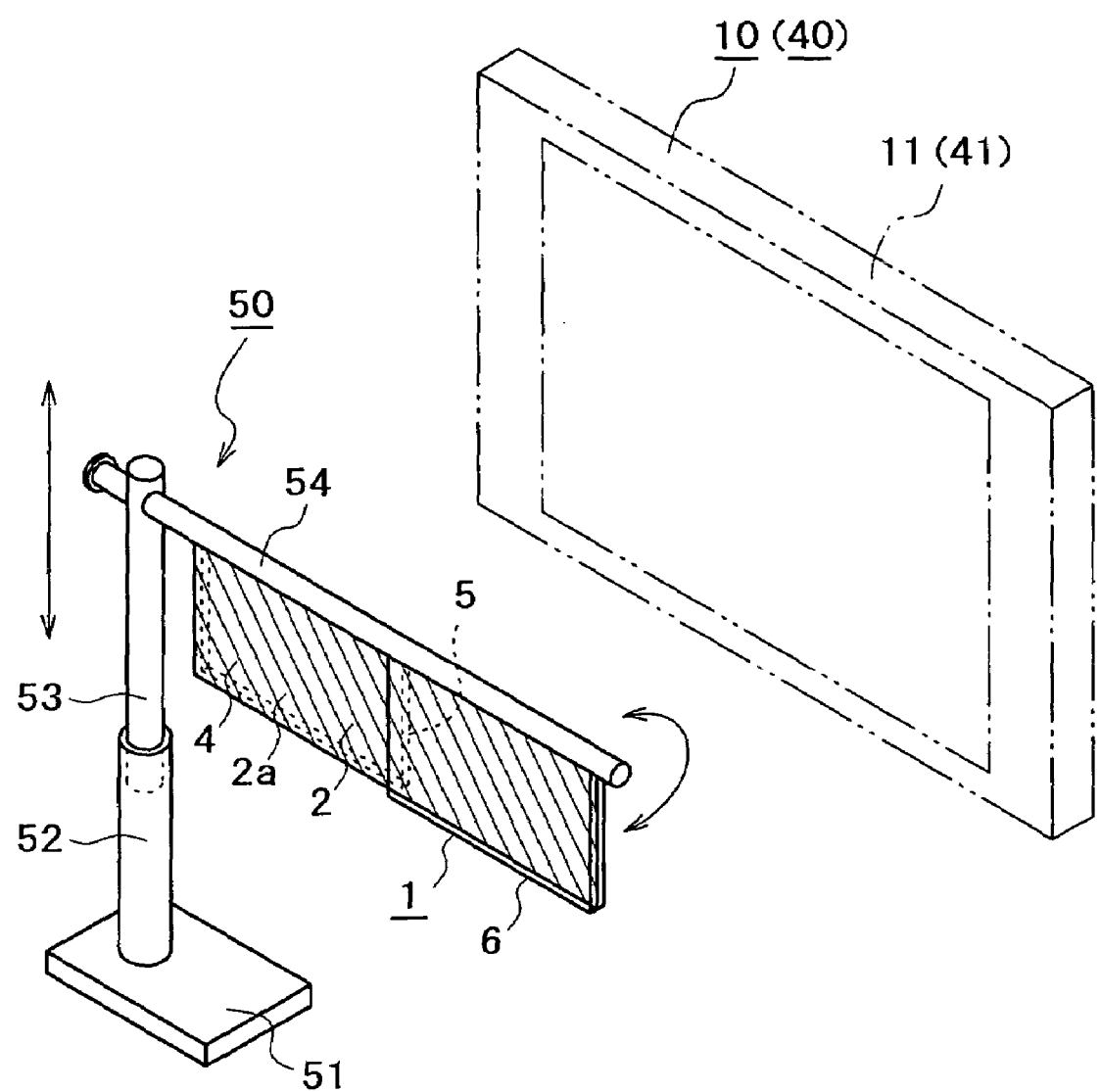
FIG. 15 is a perspective view showing a reversing mechanism before a polarizing eyeglass device is reversed.

Referring first to FIGS. 15 and 16, a reversing mechanism 50 has a function of changing the polarization angle of the polarized light separation means 2 by 90° and reversing the front and rear positions of the first polarization direction changing means 5 and the second polarization direction changing means 6. The reversing mechanism 50 includes a base member 51, a supporting tubular member 52, a supported shaft member 53, and a rotatable shaft member 54.

The supporting tubular member 52 projects upwardly from the base member 51. The supported shaft member 53 is formed long in the upward and downward direction and supported for movement in the upward and downward directions on the supporting tubular member 52. The rotatable shaft member 54 is formed long in the leftward and rightward direction and is supported at a portion in the proximity of an end thereof for rotation around an axis thereof at an upper end portion of the supported shaft member 53. The polarizing eyeglass device 1 is attached at an end edge thereof to the rotatable shaft member 54.

For example, in the service condition A, the upper end edge of the polarizing eyeglass device 1 is attached to the rotatable shaft member 54 as seen in FIG. 15. If the rotatable shaft member 54 is rotated by 180° in this condition, then the polarizing eyeglass device 1 is placed into the service condition B. The polarizing eyeglass device 1 in the service condition B is positioned above the position thereof in the service condition A. Therefore, the supported shaft member 53 is moved downwardly so that the position of the polarizing eyeglass device 1 with respect to the stereoscopic image display apparatus 10, 20, 30 or 40 may be similar to that in the service condition A as seen in FIG. 16.

If the rotatable shaft member 54 is rotated by 180° conversely from the service condition B, then the polarizing eyeglass device 1 is placed into the service condition A.

It is to be noted that, if the polarizing eyeglass device 1 is attached to the rotatable shaft member 54 in the service condition C or the service condition D in advance, then the reversing mechanism 50 can reverse the polarizing eyeglass device 1 between the service condition C and the service condition D.

Figure 17:
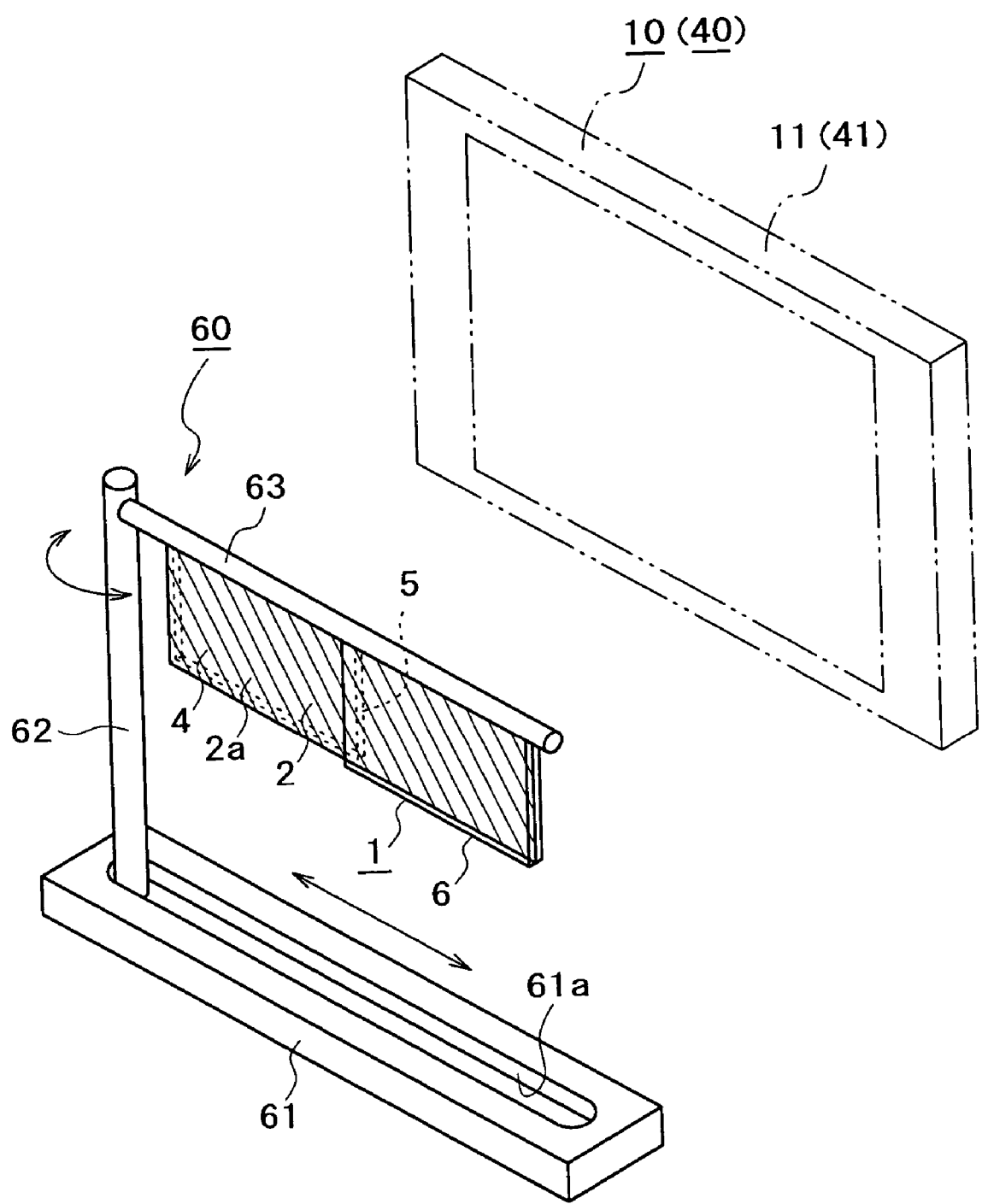
FIG. 17 is a perspective view showing another reversing mechanism before a polarizing eyeglass device is reversed.

Referring now to FIGS. 17 and 18, another reversing mechanism 60 is shown. The reversing mechanism 60 has a function of changing the polarization angle of the polarized light separation means 2 by 90° and reversing the left and right positions of the first polarization direction changing means 5 and the second polarization direction changing means 6. The reversing mechanism 60 includes a base member 61, a rotatable shaft member 62, and a attaching shaft member 63.

A guide groove 61a is formed in the base member 61 such that it extends in the leftward and rightward direction. The rotatable shaft member 62 is formed long in the upward and downward direction and is supported for rotation around an axis thereof on the base member 61 and also for movement in the leftward and rightward directions. The attaching shaft member 63 is secured at an end portion thereof to an upper end portion of the rotatable shaft member 62 and is formed long in a direction orthogonal to the rotatable shaft member 62. The polarizing eyeglass device 1 is attached at an end edge thereof to the attaching shaft member 63.

For example, in the service condition A, the polarizing eyeglass device 1 is attached at the upper end edge thereof to the attaching shaft member 63 as seen in FIG. 17. Then, if the rotatable shaft member 62 is rotated by 180° from this condition, then the polarizing eyeglass device 1 is placed into the service condition C. In the service condition C, the polarizing eyeglass device 1 is positioned leftwardly with respect to the position thereof in the service condition A. Therefore, the rotatable shaft member 62 is moved rightwardly along the guide groove 61a so that the position of the polarizing eyeglass device 1 with respect to the stereoscopic image display apparatus 10, 20, 30 or 40 may be similar to that in the service condition A as seen in FIG. 18.

If the rotatable shaft member 62 is rotated by 180° from that in the service condition C, then the polarizing eyeglass device 1 can be placed into the service condition A.

It is to be noted that, if the polarizing eyeglass device 1 is attached to the attaching shaft member 63 in the service condition B or the service condition D in advance, then the reversing mechanism 60 can reverse the polarizing eyeglass device 1 between the service condition B and the service condition D.

Figure 20:
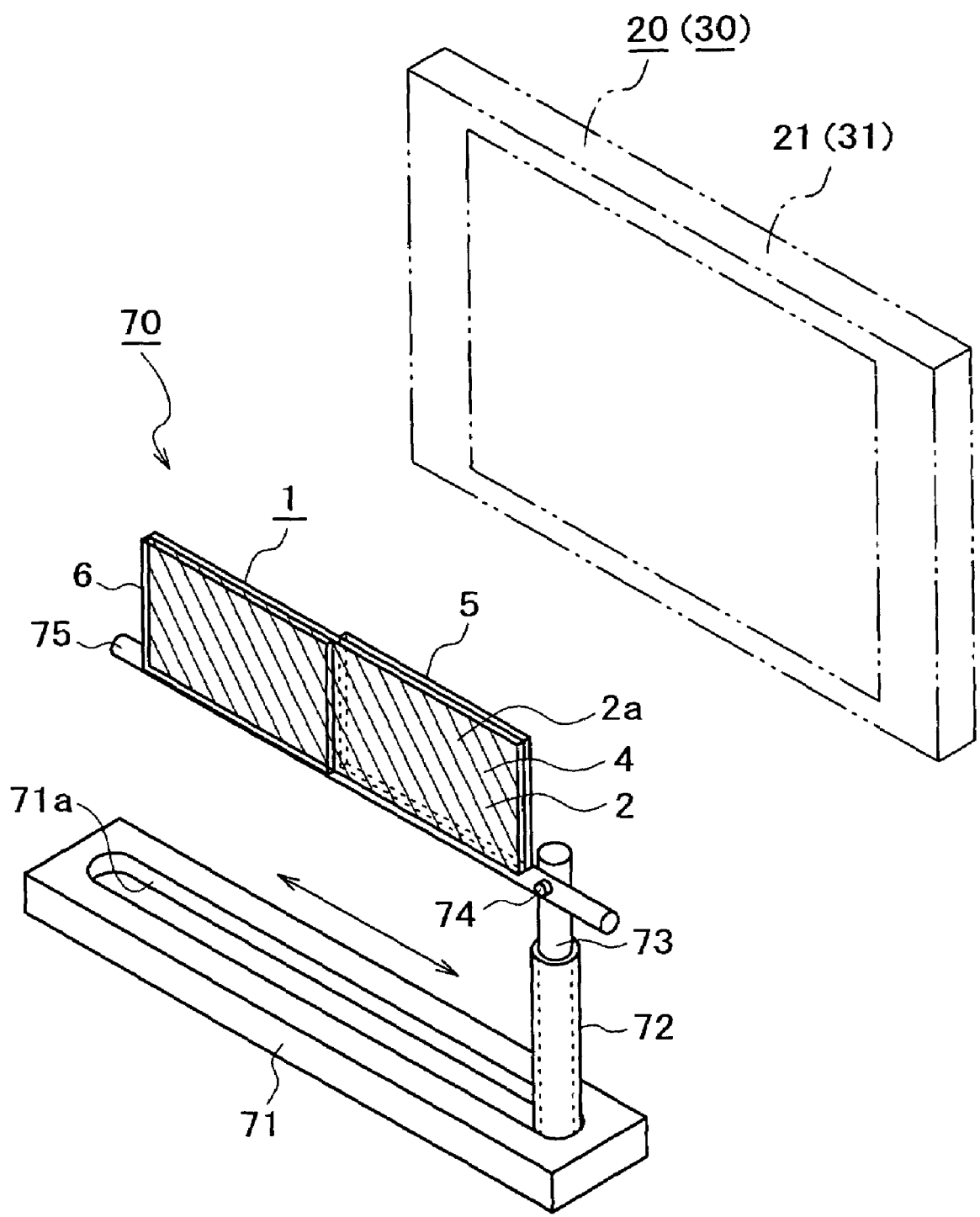
FIG. 20 is a perspective view showing the reversing mechanism of FIG. 19 but after the polarizing eyeglass device is reversed.

Referring now to FIGS. 19 and 20, a further reversing mechanism 70 is shown. The reversing mechanism 70 has a function of reversing the left and right positions of the first polarization direction changing means 5 and the second polarization direction changing means 6 without changing the polarization angle of the polarized light separation means 2. The reversing mechanism 70 includes a base member 71, a supporting tubular member 72, a supported shaft member 73, a supporting projection 74, and a rotatable shaft member 75.

A guide groove 71a is formed in the base member 71 such that it extends in the leftward and rightward direction. The supporting tubular member 72 is formed long in the upward and downward direction and is supported for movement in the leftward and rightward directions on the base member 71. The supported shaft member 73 is formed long in the upward and downward direction and supported for movement in the upward and downward directions on the supporting tubular member 72. The supporting projection 74 extends, for example, forwardly from an upper end portion of the supported shaft member 73. The rotatable shaft member 75 is formed long in a direction orthogonal to the supported shaft member 73 and is supported at an end portion thereof for rotation around an axis thereof on the supporting projection 74. The polarizing eyeglass device 1 is attached at an end edge thereof to the rotatable shaft member 75.

For example, in the service condition A, the upper end edge of the polarizing eyeglass device 1 is attached to the rotatable shaft member 75 as seen in FIG. 19, and if the rotatable shaft member 75 is rotated by 180° from this condition, then the polarizing eyeglass device 1 is placed into the service condition D. In the service condition D, the polarizing eyeglass device 1 is positioned upwardly and leftwardly with respect to the position thereof in the service condition A. Therefore, the supported shaft member 73 is moved downwardly and the supporting tubular member 72 is moved rightwardly along the guide groove 71a so that the position of the polarizing eyeglass device 1 with respect to the stereoscopic image display apparatus 10, 20, 30 or 40 may be similar to that in the service condition A as seen in FIG. 20.

If the rotatable shaft member 75 is rotated by 180° from that in the service condition D, then the polarizing eyeglass device 1 can be placed back into the service condition A.

It is to be noted that, if the polarizing eyeglass device 1 is attached to the rotatable shaft member 75 in the service condition B or the service condition C in advance, then the reversing mechanism 70 can reverse the polarizing eyeglass device 1 between the positions in the service condition B and the service condition C.

If the polarizing eyeglass device 1 is removably attached to the rotatable shaft member 54, attaching shaft member 63 or rotatable shaft member 75 in the reversing mechanism 50, 60 or 70 described above, then the polarizing eyeglass device 1 can be used in any of the service conditions A, B, C and D.

As described above, where the reversing mechanism 50, 60 or 70 is used, a desired service condition of the polarizing eyeglass device 1 or 1A can be established readily. Consequently, improvement in convenience in use can be achieved.

Now, a polarizing eyeglass device according to a second embodiment of the present invention is described. The polarizing eyeglass device 1B according to the second embodiment is different from the polarizing eyeglass device 1 described hereinabove only in that a polarization direction changing means is adhered to one of the first and second viewing regions of the polarized light separation means. Thus, in the following description, only the difference is described in detail.

Figure 21:
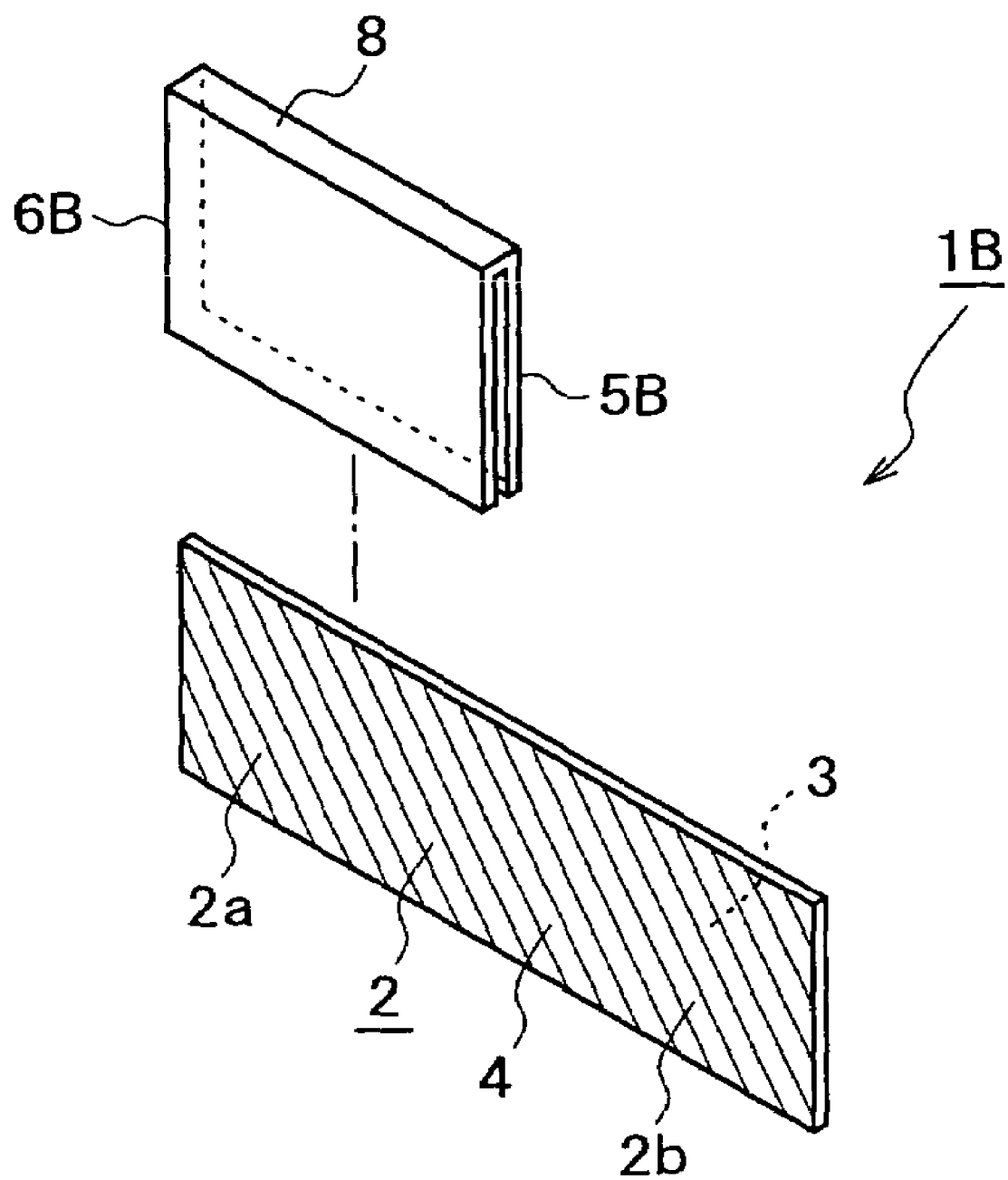
FIG. 21 is an exploded perspective view showing another polarizing eyeglass device to which the present invention is applied.
Figure 22:
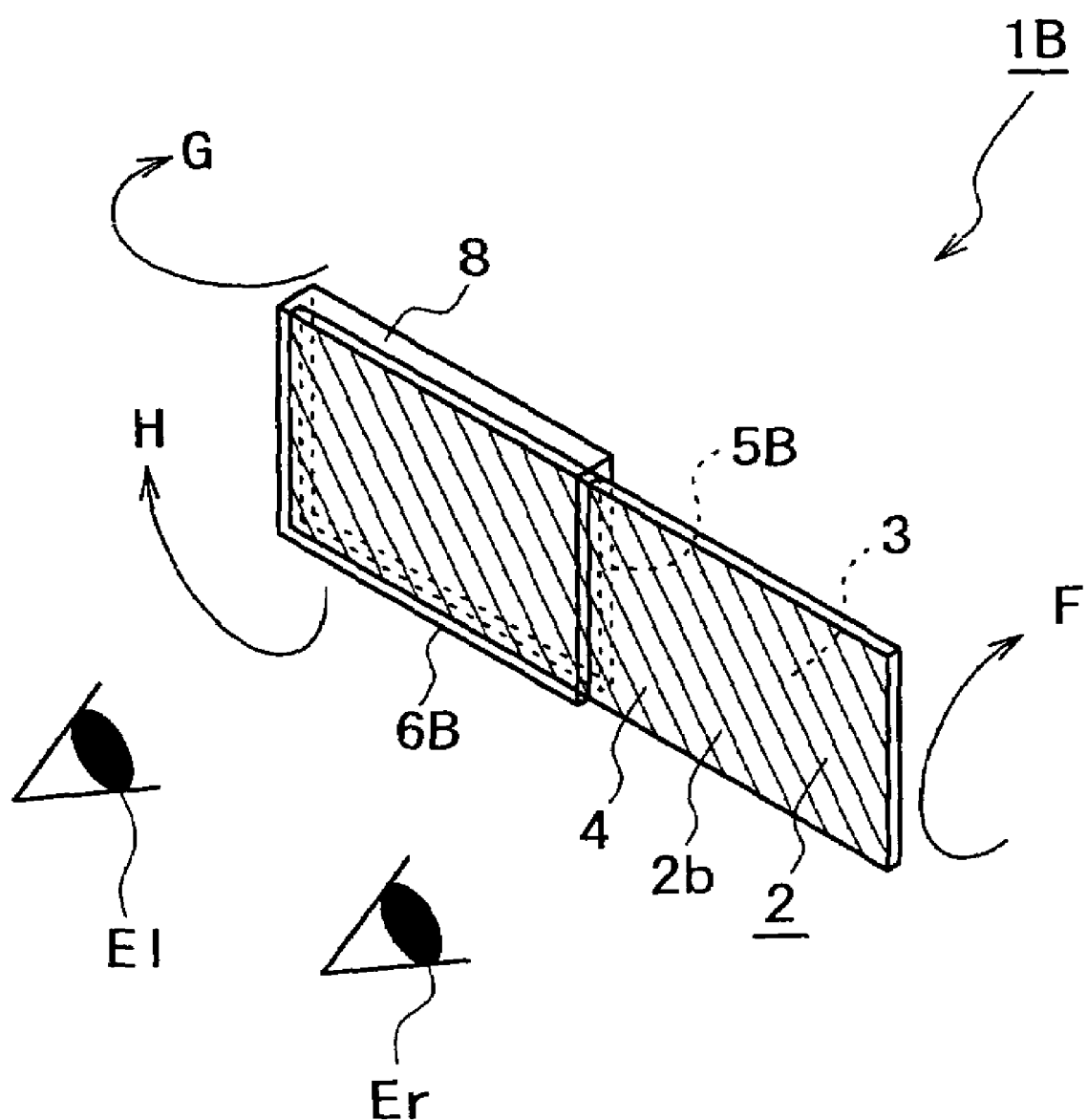
FIGS. 22 to 25 are perspective views illustrating service conditions E, F, G and H of the polarizing eyeglass device of FIG. 21, respectively.

Referring to FIGS. 21 and 22, the polarizing eyeglass device 1B has a first polarization direction changing means 5B and a second polarization direction changing means 6B adhered to the first face 3 and the second face 4 thereof, respectively, in one of the first viewing region 2a and the second viewing region 2b of the polarized light separation means 2. The first polarization direction changing means 5B and the second polarization direction changing means 6B are connected integrally to each other through a folded back portion 8.

The first polarization direction changing means 5B and the second polarization direction changing means 6B have optical axes orthogonal to those of the phase difference plates 15, 25, 35 or 45 of the stereoscopic image display apparatus 10, 20, 30 or 40. Consequently, the phase difference of the phase difference plates 15, 25, 35 or 45 is canceled by the first polarization direction changing means 5B and the second polarization direction changing means 6B.

Since the first polarization direction changing means 5B and the second polarization direction changing means 6B of the polarizing eyeglass device 1B are formed integrally as described above, reduction of the number of parts can be achieved and reduction of the production cost can be anticipated.

The polarizing eyeglass device 1B can be used in such a service condition as seen in FIG. 22 (the service condition is hereinafter referred to as "service condition E"). Referring to FIG. 22, in the service condition E illustrated, the polarized light separation means 2 has a leftwardly upwardly inclined polarization direction. Further, the first polarization direction changing means 5B is positioned on the left eye El side and on the opposite side of the viewer with respect to the polarized light separation means 2. Meanwhile, the second polarization direction changing means 6B is positioned on the left eye El side and on the side facing the viewer with respect to the polarized light separation means 2. In the service condition E described, the polarizing eyeglass device 1B operates in the following manner.

When polarized light having a leftwardly upwardly inclined polarization angle is introduced into the first polarization direction changing means 5B, the left eye El of the viewer who looks through the polarized light separation means 2 cannot view the image. This is because the polarization direction of the polarized light is changed by 90° to a rightwardly upwardly inclined polarization direction by the first polarization direction changing means 5B. However, when polarized light having a rightwardly upwardly inclined polarization angle is introduced into the first polarization direction changing means 5B, the left eye El can view the image. This is because the polarization direction of the polarized light is changed by 90° to a leftwardly upwardly inclined polarization direction by the first polarization direction changing means 5B. It is to be noted that, since the second polarization direction changing means 6B is positioned on the side facing the viewer, even if the polarization direction is changed by 90° by the second polarization direction changing means 6B, this does not have an influence upon whether or not the image can be viewed.

Meanwhile, if polarized light having a rightwardly upwardly inclined polarization angle is introduced into the polarized light separation means 2, then the right eye Er of the viewer who looks through the polarized light separation means 2 cannot view the image. However, if polarized light having a leftwardly upwardly inclined polarization angle is introduced into the polarized light separation means 2, then the right eye Er can view the image.

Figure 23:
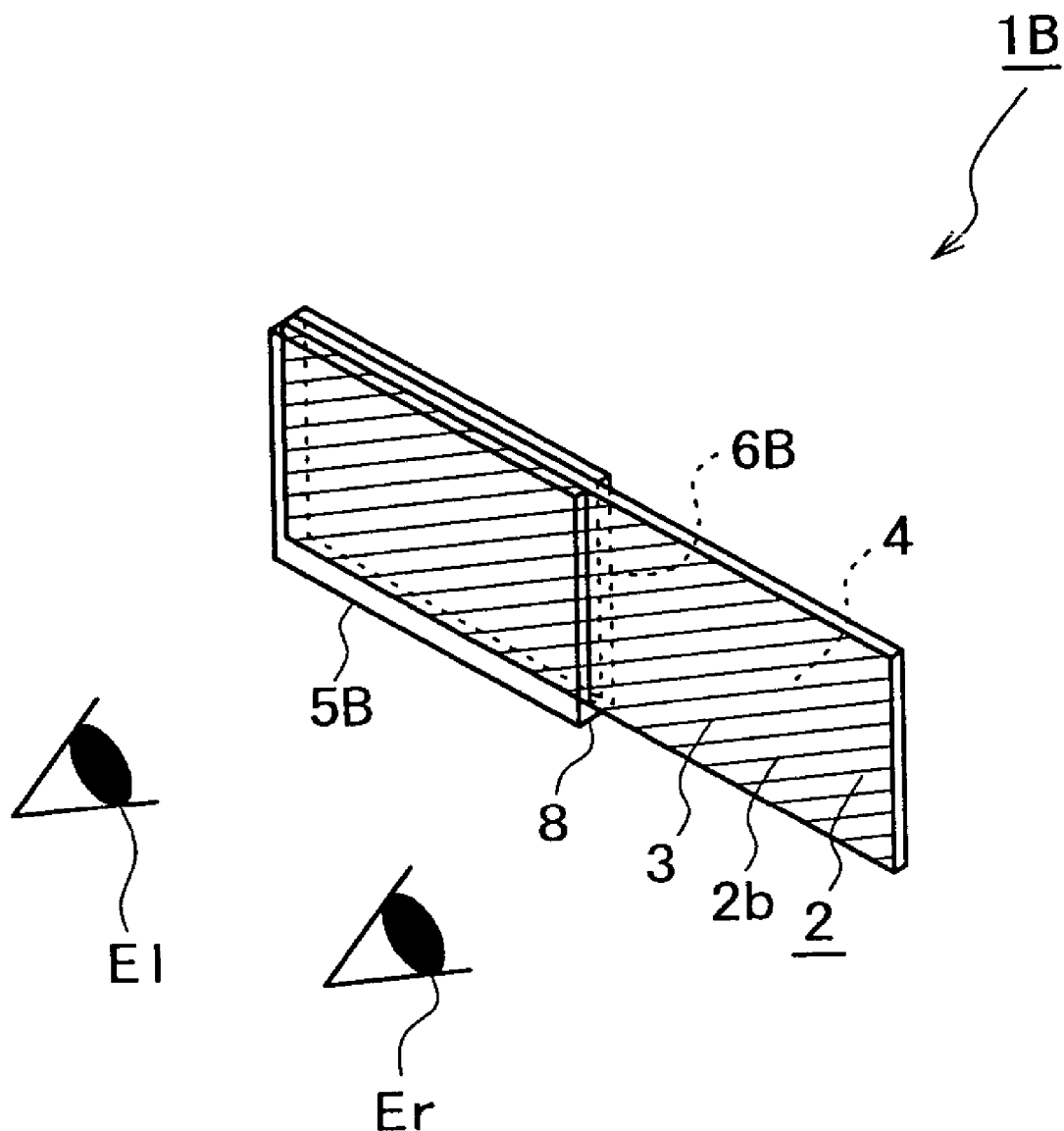
Figure 24:
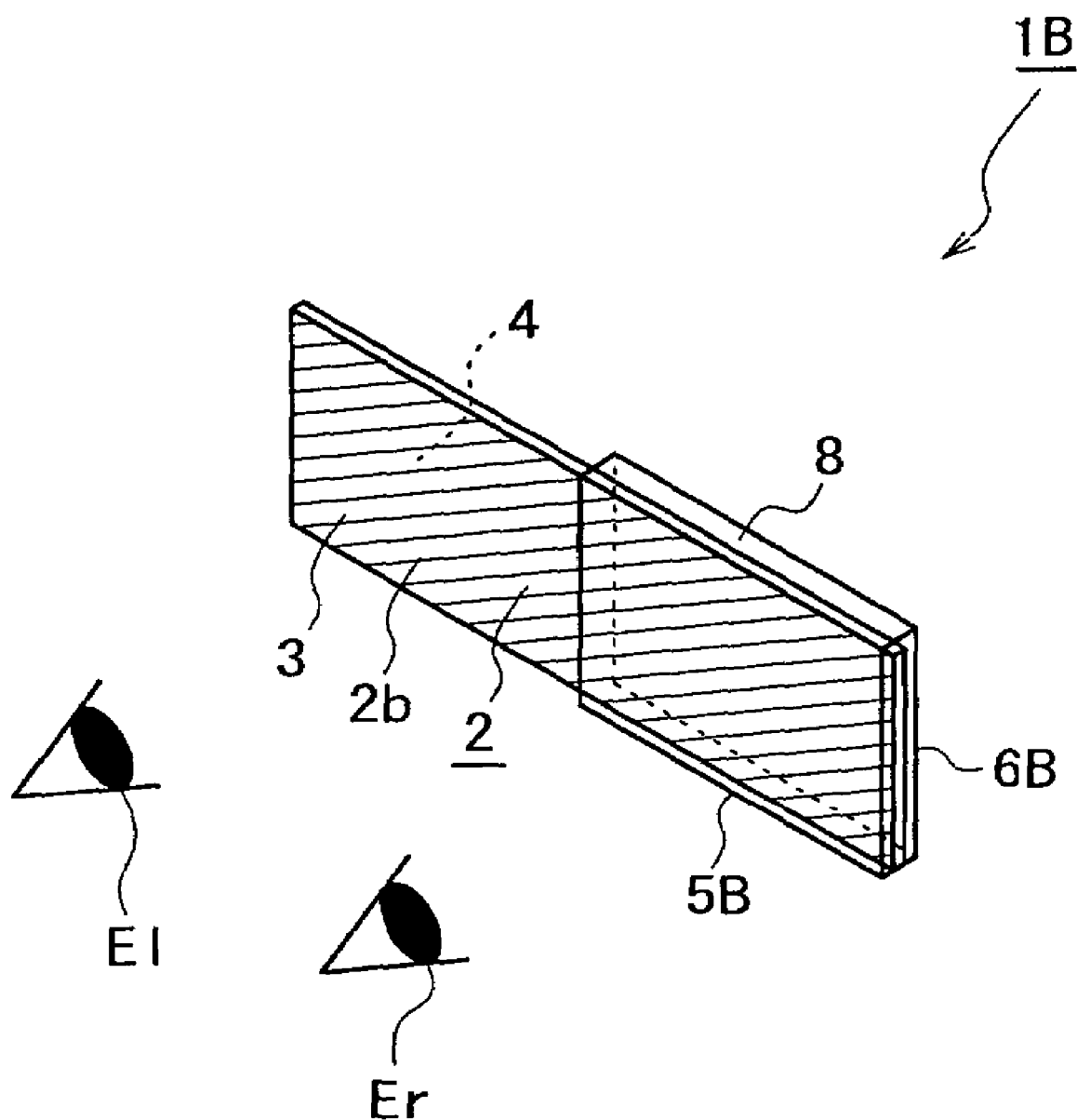
Figure 25:
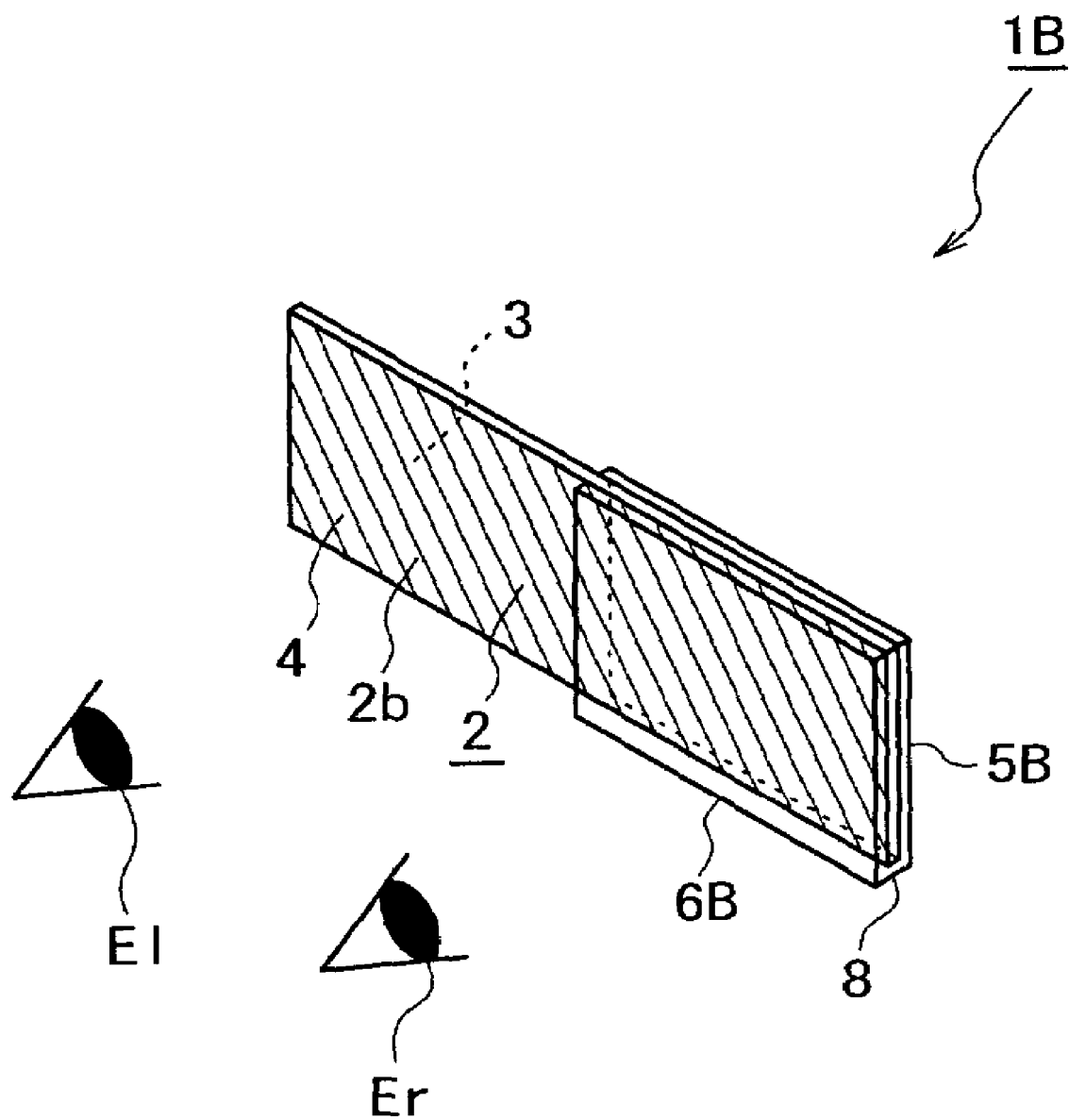

The polarizing eyeglass device 1B can be used in three service conditions including a service condition F, another service condition G and a further service condition H, as seen in FIGS. 23 to 25, respectively, in addition to the service condition E described above.

FIG. 23 illustrates the service condition F. Referring to FIG. 23, the service condition F is a condition after the polarizing eyeglass device 1B in the service condition E is reversed, for example, in the direction indicated by an arrow mark F in FIG. 22 such that an upper edge and a lower edge of the polarized light separation means 2 are positioned on the respective opposite sides, that is, on the lower and upper sides. The polarized light separation means 2 has a rightwardly upwardly inclined polarization angle.

In the service condition F, the first polarization direction changing means 5B is positioned on the left eye El side and on the side facing the viewer with respect to the polarized light separation means 2. Meanwhile, the second polarization direction changing means 6B is positioned similarly on the left eye El side but on the opposite side of the viewer with respect to the polarized light separation means 2. Further, the polarized light separation means 2 has a rightwardly upwardly inclined polarization angle.

When polarized light having a rightwardly upwardly inclined polarization angle is introduced into the polarized light separation means 2, the left eye El of the viewer who looks through the polarized light separation means 2 cannot view the image. This is because the polarization direction of the polarized light is changed by 90° to a leftwardly upwardly inclined polarization direction by the second polarization direction changing means 6B. However, when polarized light having a leftwardly upwardly inclined polarization angle is introduced into the polarized light separation means 2, the left eye El can view the image. This is because the polarization direction of the polarized light is changed by 90° to a rightwardly upwardly inclined polarization direction by the second polarization direction changing means 6B. It is to be noted that, since the first polarization direction changing means 5B is positioned on the side facing the viewer, even if the polarization direction is changed by 90° by the first polarization direction changing means 5B, this does not have an influence upon whether or not the image can be viewed.

Meanwhile, if polarized light having a leftwardly upwardly inclined polarization angle is introduced into the polarized light separation means 2, then the right eye Er of the viewer who looks through the polarized light separation means 2 cannot view the image. However, if polarized light having a rightwardly upwardly inclined polarization angle is introduced into the polarized light separation means 2, then the right eye Er can view the image.

FIG. 24 illustrates the service condition G. Referring to FIG. 24, the service condition G is a condition after the polarizing eyeglass device 1B in the service condition E is reversed, for example, in the direction indicated by an arrow mark G in FIG. 22 such that a left edge and a right edge of the polarized light separation means 2 are positioned on the respective opposite sides, that is, on the right and left sides. The polarized light separation means 2 has a rightwardly upwardly inclined polarization angle.

In the service condition G, the first polarization direction changing means 5B is positioned on the right eye Er side and on the side facing the viewer with respect to the polarized light separation means 2. Meanwhile, the second polarization direction changing means 6B is positioned similarly on the right eye Er side but on the opposite side of the viewer with respect to the polarized light separation means 2. Further, the polarized light separation means 2 has a rightwardly upwardly inclined polarization angle.

When polarized light having a leftwardly upwardly inclined polarization angle is introduced into the polarized light separation means 2, the left eye El of the viewer who looks through the polarized light separation means 2 cannot view the image. However, when polarized light having a rightwardly upwardly inclined polarization angle is introduced into the polarized light separation means 2, the left eye El can view the image.

Meanwhile, if polarized light having a rightwardly upwardly inclined polarization angle is introduced into the polarized light separation means 2, then the right eye Er of the viewer who looks through the polarized light separation means 2 cannot view the image. This is because the polarization direction of the polarized light is changed by 90° to a leftwardly upwardly inclined polarization direction by the second polarization direction changing means 6B. However, if polarized light having a leftwardly upwardly inclined polarization angle is introduced into the polarized light separation means 2, then the right eye Er can view the image. This is because the polarization direction of the polarized light is changed by 90° to a rightwardly upwardly inclined polarization direction by the second polarization direction changing means 6B. It is to be noted that, since the first polarization direction changing means 5B is positioned on the side facing the viewer, even if the polarization direction is changed by 90° by the first polarization direction changing means 5B, this does not have an influence upon whether or not the image can be viewed.

FIG. 25 illustrates the service condition H. Referring to FIG. 25, the service condition H is a condition after the polarizing eyeglass device 1B in the service condition E is reversed, for example, in the direction indicated by an arrow mark H in FIG. 22 such that a left edge and a right edge of the polarized light separation means 2 are positioned on the respective opposite sides, that is, on the right and left sides and an upper edge and a lower edge of the polarized light separation means 2 are positioned on the respective opposite sides, that is, on the lower and upper sides, respectively. The polarized light separation means 2 has a leftwardly upwardly inclined polarization angle.

In the service condition H, the first polarization direction changing means 5B is positioned on the right eye Er side and on the opposite side of the viewer with respect to the polarized light separation means 2. Meanwhile, the second polarization direction changing means 6B is positioned similarly on the right eye Er side but on the side facing the viewer with respect to the polarized light separation means 2. Further, the polarized light separation means 2 has a leftwardly upwardly inclined polarization angle.

If polarized light having a rightwardly upwardly inclined polarization angle is introduced into the polarized light separation means 2, then the left eye El of the viewer who looks through the polarized light separation means 2 cannot view the image. However, if polarized light having a leftwardly upwardly inclined polarization angle is introduced into the polarized light separation means 2, then the left eye El can view the image.

Meanwhile, when polarized light having a leftwardly upwardly inclined polarization angle is introduced into the polarized light separation means 2, the right eye Er of the viewer who looks through the polarized light separation means 2 cannot view the image. This is because the polarization direction of the polarized light is changed by 90° to a rightwardly upwardly inclined polarization direction by the first polarization direction changing means 5B. However, when polarized light having a rightwardly upwardly inclined polarization angle is introduced into the polarized light separation means 2, the right eye Er can view the image. This is because the polarization direction of the polarized light is changed by 90° to a leftwardly upwardly inclined polarization direction by the first polarization direction changing means 5B. It is to be noted that, since the second polarization direction changing means 6B is positioned on the side facing the viewer, even if the polarization direction is changed by 90° by the second polarization direction changing means 6B, this does not have an influence upon whether or not the image can be viewed.

Now, an example of manner of use of the polarizing eyeglass device 1B is described with reference to FIG. 26.

Figure 26:
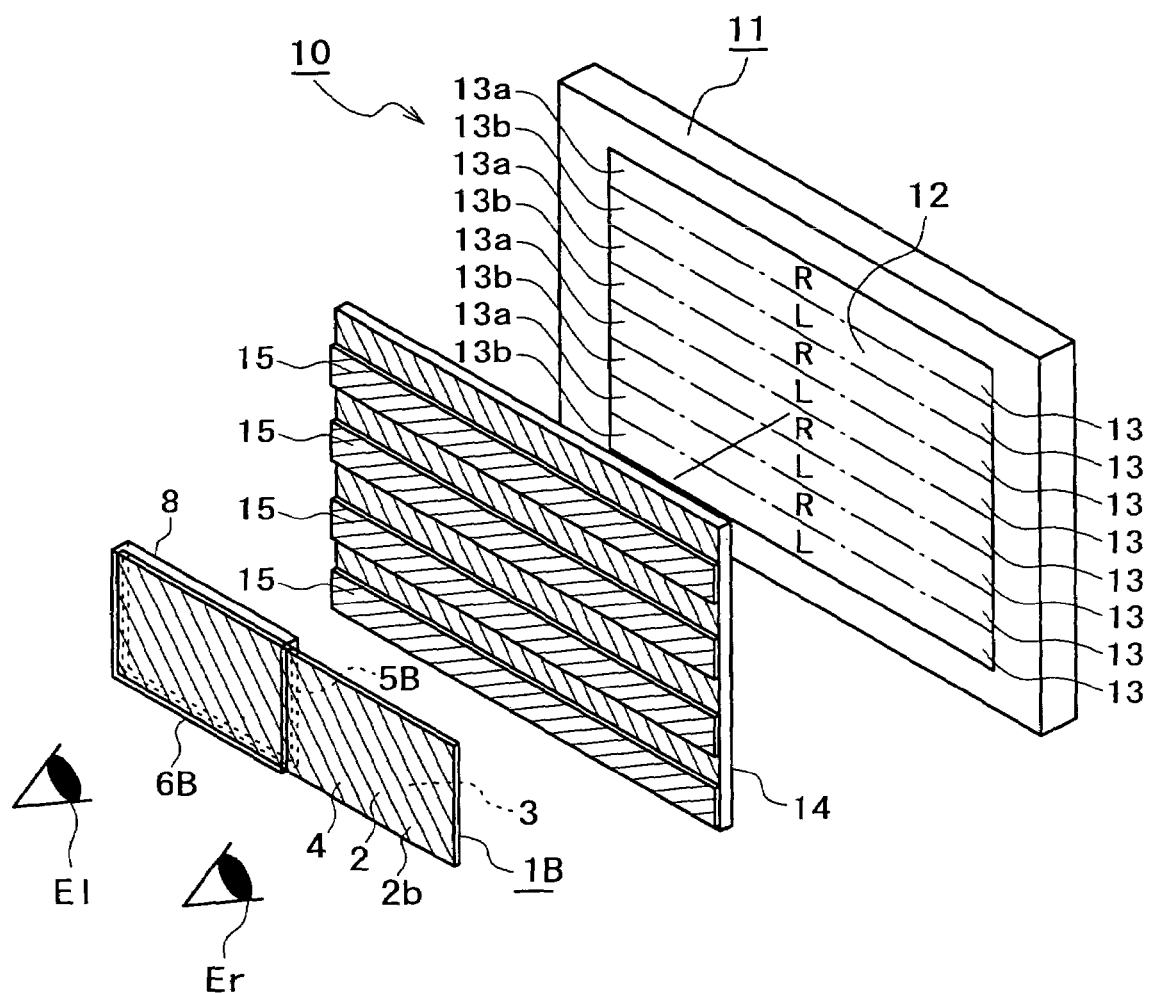
FIG. 26 is a perspective view, partly exploded, showing an example of a manner of use of the polarizing eyeglass device of FIG. 21.

Referring to FIG. 26, in the manner of use illustrated, an image displayed on the image display screen 12 of the stereoscopic image display apparatus 10 of the type I is viewed in the service condition E.

On the image display screen 12 of the stereoscopic image display apparatus 10, right eye images R are displayed in the first areas 13a while left eye images L are displayed in the second areas 13b. The polarizing plate 14 has a leftwardly upwardly inclined polarization angle.

When the image display screen 12 is viewed with the polarizing eyeglass device 1B in the service condition E, the left eye El of the viewer who looks through the polarized light separation means 2 cannot view the image. This is because the polarization direction of polarized light for the right eye images R emitted from the first areas 13a through the polarizing plate 14 is changed by 90° by the first polarization direction changing means 5B positioned between the polarizing plate 14 and the polarized light separation means 2 which have polarization angles same as each other. In contrast, the left eye images L can be viewed with the left eye El. This is because, although the polarization angle of polarized light for the right eye images R emitted from the second areas 13b through the polarizing plate 14 is rotated approximately by 90° by the phase difference plates 15 positioned between the polarizing plate 14 and the polarized light separation means 2 which have polarization angles same as each other, the coordinate axis of the polarized light is rotated by 90° by the first polarization direction changing means 5B to cancel the phase difference. This is equivalent to a situation that the phase difference plates 15 are not present. Therefore, the left eye El can view the left eye images L because of the orthogonal polarization conditions of the polarizing plate 14 and the polarized light separation means 2. Further, the light is intercepted fully and does not cause crosstalk. It is to be noted that, since the second polarization direction changing means 6B is positioned on the side facing the viewer, even if the polarization direction is changed by 90° by the second polarization direction changing means 6B, this does not have an influence upon whether or not the image can be viewed.

Meanwhile, the right eye Er of the viewer who looks through the polarized light separation means 2 cannot view the left eye images L. This is because the polarization direction of the polarized light emitted from the second areas 13b through the polarizing plate 14 is changed by 90° by the phase difference plates 15 positioned between the polarizing plate 14 and the polarized light separation means 2 which have polarization angles same as each other. In contrast, the right eye Er can view the right eye images R. This is because the polarization angles of the polarizing plate 14 and the polarized light separation means 2 are equal to each other and the polarized light emitted from the first areas 13a through the polarizing plate 14 passes through the polarized light separation means 2.

FIG. 27 illustrates the compatibility between the service conditions E, F, G and H of the polarizing eyeglass device 1B and the types of the stereoscopic image display apparatus, that is, the type I to type IV. In FIG. 27, "◯" indicates that an image can be viewed, and "X" indicates that an image cannot be viewed. However, where the polarization directions of the polarizing plate of the stereoscopic image display apparatus and the polarized light separation means 2 of the polarizing eyeglass device 1B are same as each other, there is the possibility that the left eye El or the right eye Er may view the right eye images R or the left eye images L which are images of the opposite side respectively due to the wavelength dependency of the phase difference plate that it exhibits a different rotational angle depending upon the wavelength. Thus, also in FIG. 27, such a case as just described is represented by "Δ" similarly as in FIG. 11.

As seen from FIG. 27, an image displayed on any of the stereoscopic image display apparatus of the types I to IV can be viewed in a certain service condition of the polarizing eyeglass device 1B. Discrimination of in which service condition the polarizing eyeglass device 1B can be used for each of the types I to IV can be performed by reversing the polarizing eyeglass device 1B in an arbitrary service condition in an arbitrary direction, for example, in the direction indicated by the arrow mark F, G or H in FIG. 22 and confirming whether or not an image can be viewed with both of the two eyes El and Er.

As described above, the polarizing eyeglass device 1B can be used in a certain service condition to view an image displayed on any of the image display screens 12, 22, 32 and 42 of the stereoscopic image display apparatus 10, 20, 30 and 40 of the various types. Therefore, improvement in compatibility can be achieved, and the cost can be reduced as much.

Further, the polarizing eyeglass device 1B eliminates such a disadvantage that a polarizing eyeglass device prepared intentionally for viewing a stereoscopic image by a viewer is not compatible with a stereoscopic image display apparatus on which the image to be viewed is to be displayed. Consequently, improvement in convenience is use can be achieved.

Also the polarizing eyeglass device 1B may be covered with a transparent protective layer similarly to the polarizing eyeglass device 1 described hereinabove. The modified polarizing eyeglass device of the type just described is shown as an polarizing eyeglass device 1C in FIG. 28.

Figure 28:
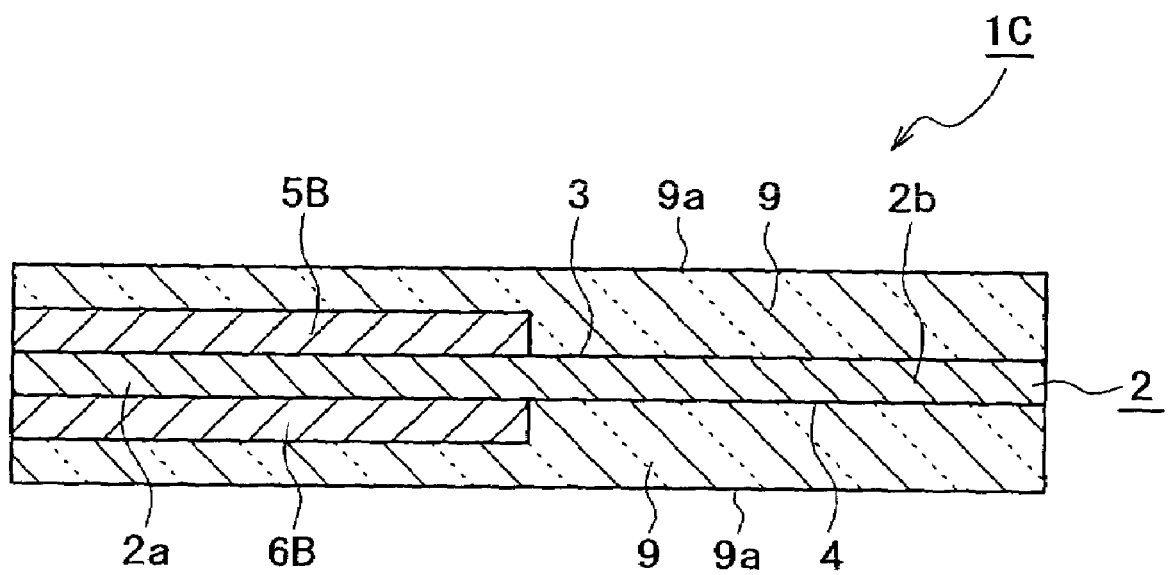
FIG. 28 is an enlarged sectional view of a modification to the polarizing eyeglass device of FIG. 21 which is covered with a transparent protective layer.

Referring to FIG. 28, the polarizing eyeglass device 1C includes transparent protective layers 9 provided on the first face 3 and the second face 4 of the polarized light separation means 2 such that they cover the first polarization direction changing means 5B and the second polarization direction changing means 6B, respectively. The transparent protective layers 9 have outer faces 9a formed as flat faces thereon.

Also the transparent protective layers 9 are preferably formed from a material which is low in birefringence and high in moisture resistance, abrasive resistance, light resistance and chemical resistance similarly to the transparent protective layers 7 of the polarizing eyeglass device 1A. As a material of the type mentioned, for example, an acrylic resin such as a polymethyl methacrylate resin, polycarbonate, polypropylene or silicon rubber can be used.

Where the transparent protective layers 9 are provided in this manner, exfoliation of the first polarization direction changing means 5B and the second polarization direction changing means 6B from the polarized light separation means 2 can be prevented. Besides, deterioration of the first polarization direction changing means 5B and the second polarization direction changing means 6B by moisture absorption or some other cause can be prevented.

It is to be noted that also the polarizing eyeglass device 1B and the polarizing eyeglass device 1C can be used in any desired one of the service conditions E, F, G and H by reversing the same using the reversing mechanism 50, 60 or 70.

Subsequently, description is given of a method of discriminating whether or not the polarizing eyeglass device 1, 1A, 1B or 1C is used in an appropriate service condition (direction) with respect to any of the stereoscopic image display apparatus 10, 20, 30 and 40 of the types I to IV with reference to FIGS. 29 to 31. Use of the discrimination method can eliminate such a trouble that, for example, where an object X and another object Y are included in the image display screen 12, 22, 32 or 42 and a stereoscopic image correctly looks that the object X exists farther than the object Y, the object Y looks existing farther than the object X in error.

Figure 29:
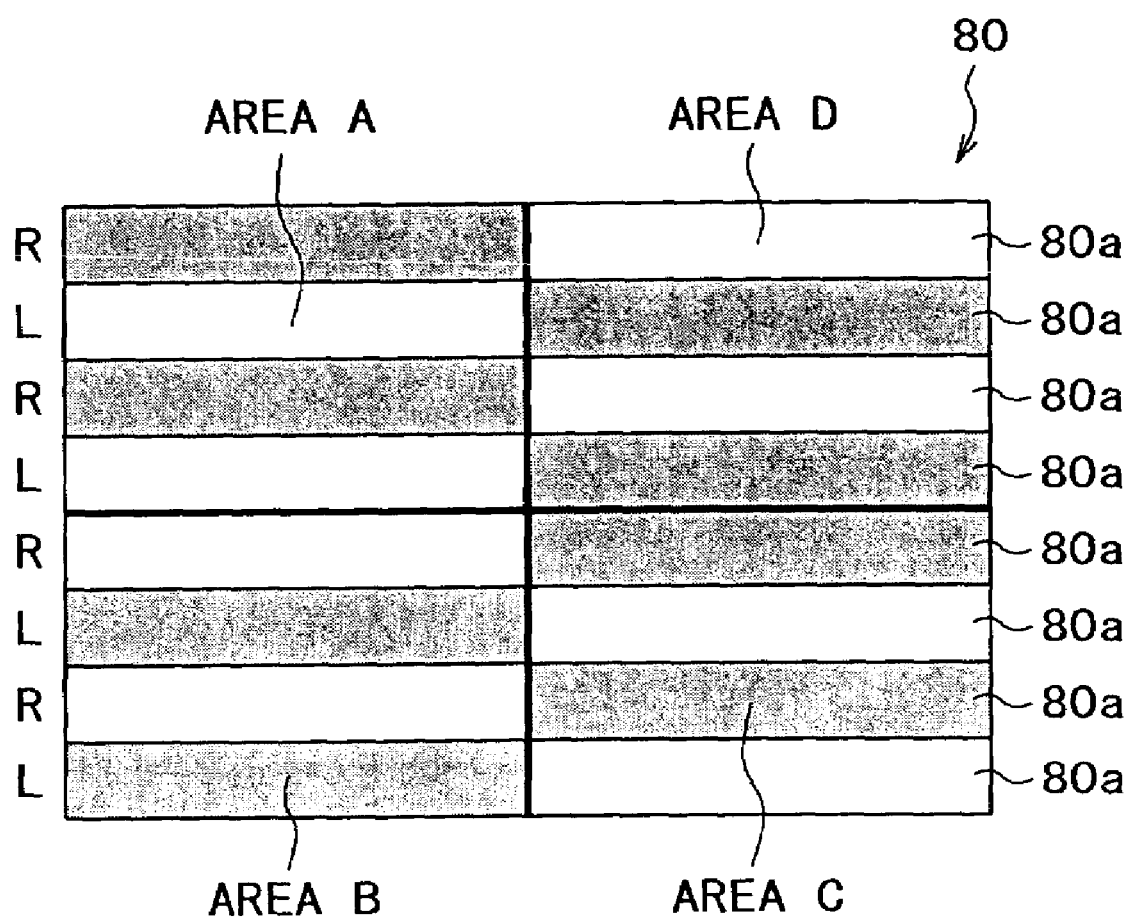
FIG. 29 is a schematic view illustrating a concept of a check pattern.

Such a white and black check pattern 80 as shown in FIG. 29 is displayed on the image display screen 12, 22, 32 or 42. The check pattern 80 is artificially divided equally, for example, into four portions and thus includes a left upper area A, a left lower area B, a right lower area C and a right upper area D. In the areas A and C, divisional patterns of black, white, black and white are formed at equal intervals from the upper side. In the areas B and D, divisional patterns of white, black, white and black are formed at equal intervals from the upper side. Accordingly, the check pattern 80 is divided in the vertical direction into eight regions 80a each including two black and white divisional patterns.

The regions 80a correspond to the first areas 13a, 23a, 33a or 43a or the second areas 13b, 23b, 33b or 43b of the horizontal areas 13, 23, 33 or 43. Accordingly, the divisional patterns of the regions 80a alternately represent the right eye images R and the left eye images L in order from the upper side.

The check pattern 80 described above is viewed only with the right eye Er first using the polarizing eyeglass device 1, or 1A, 1B or 1C. In this instance, only the right eye images R are visually observed. Consequently, such an image as seen in FIG. 30 is taken into the right eye Er of the viewer.

Then, the check pattern 80 is viewed only with the left eye El using the polarizing eyeglass device 1, or 1A, 1B or 1C. Now, only the left eye images L are visually observed. Consequently, such an image as seen in FIG. 31 is taken into the left eye El of the viewer.

Figure 30:
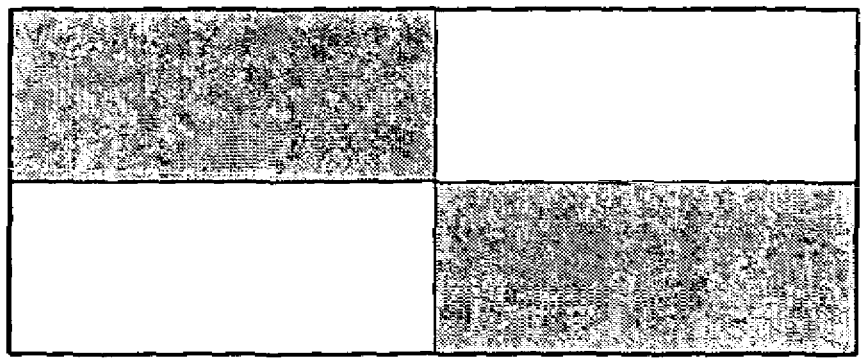
FIG. 30 is a schematic view illustrating a concept of an image when the check pattern of FIG. 29 is viewed with the right eye.
Figure 31:
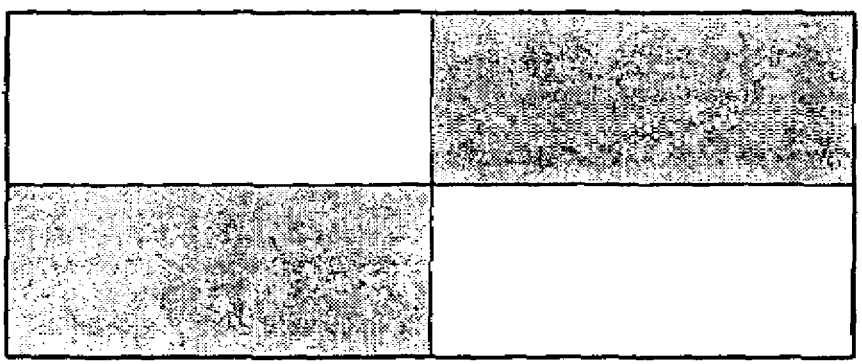
FIG. 31 is a schematic view illustrating a concept of an image when the check pattern of FIG. 29 is viewed with the left eye.
Figure 32:
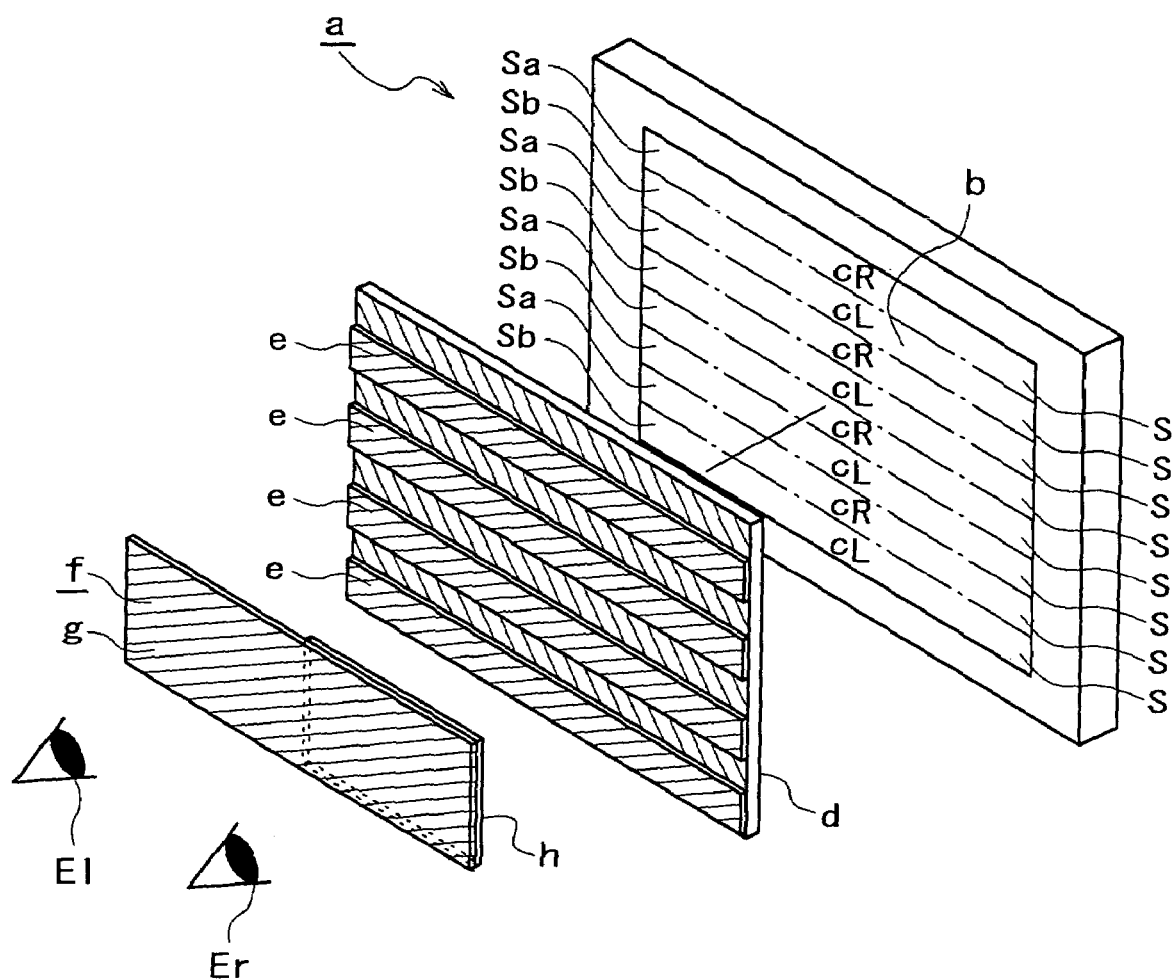
FIG. 32 is a perspective view, partly exploded, showing a conventional polarizing eyeglass device together with a stereoscopic image display apparatus.
Figure 33:
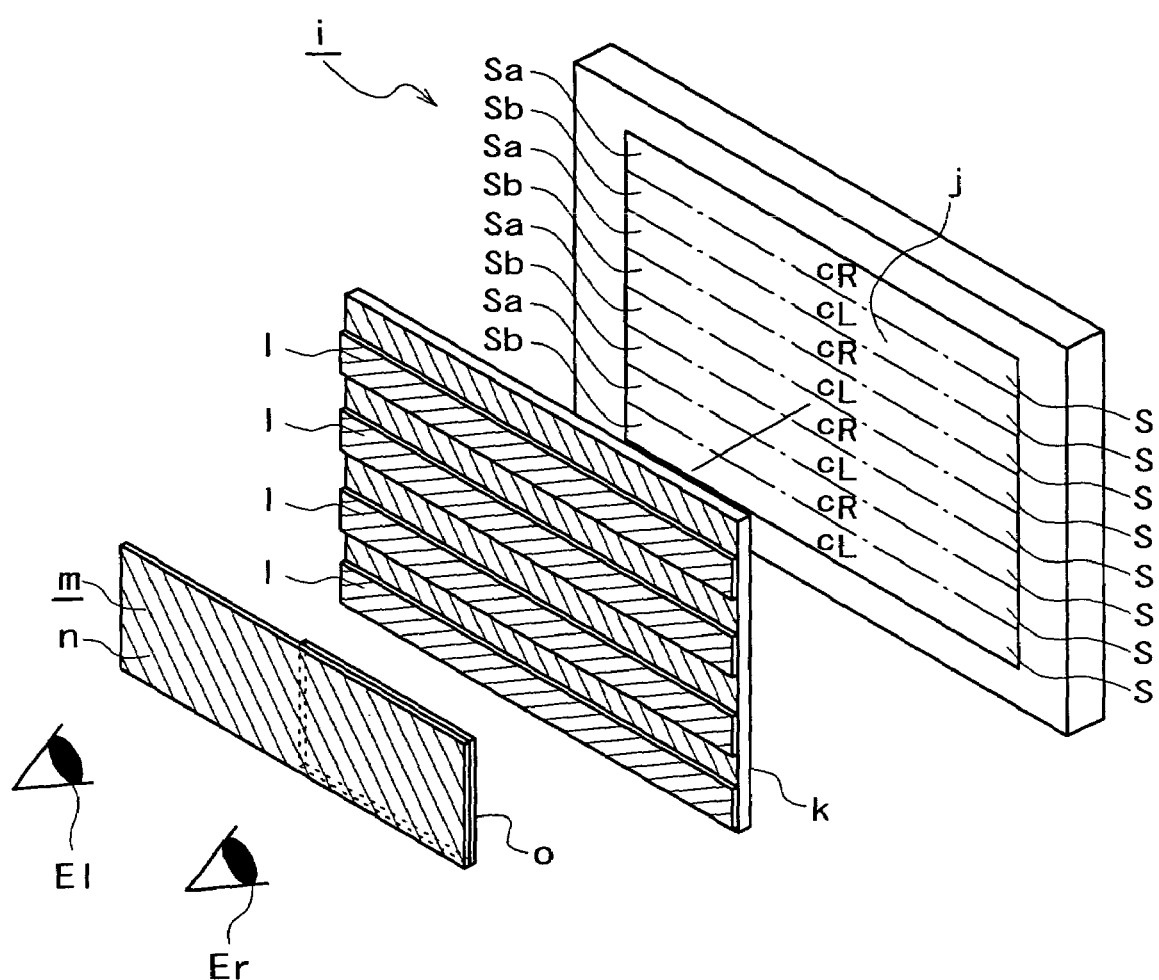
FIG. 33 is a perspective view, partly exploded, showing another conventional polarizing eyeglass device together with another stereoscopic image display apparatus.

The images shown in FIGS. 30 and 31 are obtained only when the polarizing eyeglass device 1, 1A, 1B or 1C is used in an appropriate service condition or direction. Accordingly, after the images are recognized in advance, when the polarizing eyeglass device 1, 1A, 1B or 1C is used, the check pattern 80 is viewed separately with the right eye Er and with the left eye El to confirm whether or not the images shown in FIGS. 30 and 31 are taken into the right eye Er and the left eye El, respectively. By the confirmation, it can be discriminated whether or not the polarizing eyeglass device 1, 1A, 1B or 1C is used in an appropriate service condition.

It is to be noted that the polarization direction of the polarizing plate 14, 24, 34 or 44 of the stereoscopic image display apparatus 10, 20, 30 or 40 described above is an oblique direction. However, the present invention can be applied also where the polarization direction of a polarizing plate is not an oblique direction but a horizontal direction or a vertical direction. In this instance, also the polarization direction of the polarized light separation means 2 of the polarizing eyeglass device 1, 1A, 1B or 1C is not an oblique direction but a horizontal direction or a vertical direction.

While preferred embodiments of the present invention have been described using specific terms, such description is for illustrative purposes only, and it is to be understood that changes and variations may be made without departing from the spirit or scope of the following claims.

What is claimed is:

1. A polarizing eyeglass device adaptable for use with a first type and a third type of stereoscopic image display apparatus, the first type and the third type of stereoscopic image display apparatus comprising an image display screen having first areas and second areas in which pieces of image information corresponding to a parallax are displayed individually, a polarizing plate disposed in front of the image display screen, phase difference plates adhered to a front face of the polarizing plate at positions corresponding to the first areas of the image display screen for changing the polarization direction by 90°, and wherein the first type and the third type of display apparatus have a configuration wherein the first areas of the image display screen are intended for displaying pieces of image information intended for viewing with a left eye and the second areas of the image display screen are intended for displaying pieces of image information intended for viewing with a right eye, and wherein a polarization angle of the polarizing plate of the first type of display apparatus is orthogonal to a polarization angle of the polarizing plate of the third type of display apparatus, the polarizing eyeglass device adaptable for use to view an image displayed on the image display screen, the polarizing eyeglass device comprising:

polarized light separation means for separating polarized light, the polarized light separation means including a first viewing region to be used for viewing with one of the left eye and the right eye and a second viewing region to be used for viewing with the other one of the left eye and the right eye;

first polarization direction changing means adhered to a first face of the polarized light separation means in the first viewing region for changing the polarization direction by 90°;

second polarization direction changing means adhered to a second face opposite to the first face of the polarized light separation means in the second viewing region for changing the polarization direction by 90°;

wherein the polarizing eyeglass device is adaptable for use in a first arrangement with the first type of display apparatus, wherein the polarized light separation means has a polarization angle orthogonal to the polarization angle of the polarizing plate of the first type of display apparatus, the first viewing region used for viewing with the left eye, the second viewing region used for viewing with the right eye, and the polarized light separation means disposed between the first type of display apparatus and the first polarization direction changing means;

wherein the polarizing eyeglass device is further adaptable for use in a second arrangement with the third type of display apparatus, wherein the polarization angle of the polarized light separation means is orthogonal to the polarization angle of the polarizing plate of the third type of display apparatus, the first viewing region used for viewing with the right eye, the second viewing region used for viewing with the left eye, and the polarized light separation means disposed between the third type of display apparatus and the second polarization direction changing means; and whereby reversing the polarizing eyeglass device between the first and second arrangement and switching between the first and third type of display apparatus, respectively, preserves stereoscopic image viewing.

2. The polarizing eyeglass device according to claim 1, further comprising a pair of transparent protective layers for covering the polarized light separation means and the first and second polarization direction changing means, the transparent protective layers having outside faces individually formed as flat faces thereon.

3. The polarizing eyeglass device according to claim 1, further comprising a reversing mechanism for rearranging the polarizing eyeglass device between the first arrangement and the second arrangement.

4. The polarizing eyeglass device according to claim 1, wherein the polarizing eyeglass device is further adaptable for use with a second type and a fourth type of stereoscopic image display apparatus, the second type and the fourth type of stereoscopic image display apparatus comprising an image display screen having first areas and second areas in which pieces of image information corresponding to a parallax are displayed individually, a polarizing plate disposed in front of the image display screen, phase difference plates adhered to a front face of the polarizing plate at positions corresponding to the first areas of the image display screen for changing the polarization direction by 90°, and wherein the second type and the fourth type of display apparatus have a configuration wherein the first areas of the image display screen are intended for displaying pieces of image information intended for viewing with the right eye and the second areas of the image display screen are intended for displaying pieces of image information intended for viewing with the left eye, and wherein a polarization angle of the polarizing plate of the second type of display apparatus is orthogonal to a polarization angle of the polarizing plate of the fourth type of display apparatus, the polarizing eyeglass device adaptable for use to view an image displayed on the image display screen, wherein the polarizing eyeglass device is further adaptable for use in a third arrangement with the second type of display apparatus, wherein the polarization angle of the polarized light separation means is orthogonal to the polarization angle of the polarizing plate of the second type of display apparatus, the first viewing region used for viewing with the right eye, the second viewing region used for viewing with the left eye, and the polarized light separation means disposed between the second type of display apparatus and the first polarization direction changing means;

wherein the polarizing eyeglass device is further adaptable for use in a fourth arrangement with the fourth type of display apparatus, wherein the polarization angle of the polarized light separation means is orthogonal to the polarization angle of the polarizing plate of the fourth type of display apparatus, the first viewing region used for viewing with the left eye, the second viewing region used for viewing with the right eye, and the polarized light separation means disposed between the fourth type of display apparatus and the second polarization direction changing means; and whereby reversing the polarizing eyeglass device between the third and fourth arrangement and switching between the second and fourth type of display apparatus, respectively, preserves stereoscopic image viewing.

5. The polarizing eyeglass device according to claim 4, further comprising a reversing mechanism for rearranging the polarizing eyeglass device between the third arrangement and the fourth arrangement.

6. A polarizing eyeglass device adaptable for use with a first type and a third type of stereoscopic image display apparatus, the first type and the third type of stereoscopic image display apparatus comprising an image display screen having first areas and second areas in which pieces of image information corresponding to a parallax are displayed individually, a polarizing plate disposed in front of the image display screen, phase difference plates adhered to a front face of the polarizing plate at positions corresponding to the first areas of the image display screen for changing the polarization direction by 90°, and wherein the first type and the third type of display apparatus have a configuration wherein the first areas of the image display screen are intended for displaying pieces of image information intended for viewing with a left eye, and the second areas of the image display screen are intended for displaying pieces of image information intended for viewing with a right eye, and wherein a polarization angle of the polarizing plate of the first type of display apparatus is orthogonal to a polarization angle of the polarizing plate of the third type of display apparatus, the polarizing eyeglass device adaptable for use to view an image displayed on the image display screen, the polarizing eyeglass device comprising:

polarized light separation means for separating polarized light, the polarized light separation means including a first viewing region to be used for viewing with one of the left eye and the right eye and a second viewing region to be used for viewing with the other one of the left eye and the right eye;

first polarization direction changing means for changing the polarization direction by 90°, wherein the first polarization direction changing means is adhered to a first face of the polarized light separation means in the second viewing region;

second polarization direction changing means for changing the polarization direction by 90°, wherein the second polarization direction changing means is adhered to a second face opposite to the first face of the polarized light separation means in the second viewing region;

wherein the polarizing eyeglass device is adaptable for use in a first arrangement with the first type of display apparatus, wherein the polarized light separation means has a polarization angle orthogonal to the polarization angle of the polarizing plate of the first type of display apparatus, the first viewing region used for viewing with the left eye, the second viewing region used for viewing with the right eye, and the polarized light separation means disposed between the first type of display apparatus and the first polarization direction changing means;

wherein the polarizing eyeglass device is further adaptable for use in a second arrangement with the third type of display apparatus, wherein the polarization angle of the light separation means is orthogonal to the polarization angle of the polarizing plate of the third display apparatus, the first viewing region used for viewing with the left eye, the second viewing region used for viewing with the right eye, and the polarized light separation means disposed between the third type of display apparatus and the second polarization direction changing means; and whereby reversing the polarizing eyeglass device between the first and second arrangement and switching between the first and third type of display apparatus, respectively, preserves stereoscopic image viewing.

7. The polarizing eyeglass device according to claim 6, further comprising a pair of transparent protective layers for covering the polarized light separation means and the first and second polarization direction changing means, the transparent protective layers having outside faces individually formed as flat faces thereon.

8. The polarizing eyeglass device according to claim 6, further comprising a reversing mechanism for rearranging the polarizing eyeglass device between the first arrangement and the second arrangement.

9. The polarizing eyeglass device according to claim 6, wherein the first and second polarization direction changing means are formed integrally through a folded back portion.

10. The polarizing eyeglass device according to claim 6, wherein the polarizing eyeglass device is further adaptable for use with a second type and a fourth type of stereoscopic image display apparatus, the second type and the fourth type of stereoscopic image display apparatus comprising an image display screen having first areas and second areas in which pieces of image information corresponding to a parallax are displayed individually, a polarizing plate disposed in front of the image display screen, phase difference plates adhered to a front face of the polarizing plate at positions corresponding to the first areas of the image display screen for changing the polarization direction by 90°, and wherein the second type and the fourth type of display apparatus have a configuration wherein the first areas of the image display screen are intended for displaying pieces of image information intended for viewing with the right eye and the second areas of the image display screen are intended for displaying pieces of image information intended for viewing with the left eye, and wherein a polarization angle of the polarizing plate of the second type of display apparatus is orthogonal to a polarization angle of the polarizing plate of the fourth type of display apparatus, the polarizing eyeglass device adaptable for use to view an image displayed on the image display screen, wherein the polarizing eyeglass device is further adaptable for use in a third arrangement with the second type of display apparatus, wherein the polarization angle of the polarized light separation means is orthogonal to the polarization angle of the polarizing plate of the second type of display apparatus, the first viewing region used for viewing with the right eye, the second viewing region used for viewing with the left eye, and the polarized light separation means disposed between the second type of display apparatus and the first polarization direction changing means;

wherein the polarizing eyeglass device is further adaptable for use in a fourth arrangement with the third type of display apparatus, wherein the polarization angle of the light separation means is orthogonal to the polarization angle of the polarizing plate of the fourth display apparatus, the first viewing region used for viewing with the right eye, the second viewing region used for viewing with the left eye, and the polarized light separation means disposed between the fourth type of display apparatus and the second polarization direction changing means; and whereby reversing the polarizing eyeglass device between the third and fourth arrangement and switching between the second and fourth type of display apparatus, respectively, preserves stereoscopic image viewing.

11. The polarizing eyeglass device according to claim 10, further comprising a reversing mechanism for rearranging the polarizing eyeglass device between the third arrangement and the fourth arrangement.

* * * * *